United States Patent
Soulliere et al.

(10) Patent No.: US 8,982,535 B2
(45) Date of Patent: *Mar. 17, 2015

(54) CELL DESIGN FOR HIGH ENERGY DENSITY ELECTROCHEMICAL DOUBLE LAYER CAPACITORS

(75) Inventors: Mark J Soulliere, Corning, NY (US); Todd Marshall Wetherill, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/603,760

(22) Filed: Sep. 5, 2012

(65) Prior Publication Data
US 2013/0120907 A1  May 16, 2013

Related U.S. Application Data

(63) Continuation-in-part of application No. 13/297,847, filed on Nov. 16, 2011, now abandoned.

(51) Int. Cl.
*H01G 9/00* (2006.01)
*H01G 11/78* (2013.01)
*H01G 11/26* (2013.01)
*H01G 11/84* (2013.01)

(52) U.S. Cl.
CPC .............. *H01G 11/78* (2013.01); *H01G 11/26* (2013.01); *H01G 11/84* (2013.01); *Y02T 10/7022* (2013.01); *Y02E 60/13* (2013.01)
USPC .......................................... 361/502; 29/25.03

(58) Field of Classification Search
CPC ............................... H01G 11/26; H01G 11/75
USPC .......................................................... 361/502
See application file for complete search history.

(56) References Cited

U.S. PATENT DOCUMENTS

| 5,856,047 A | 1/1999 | Venkatesan et al. | 429/245 |
|---|---|---|---|
| 7,394,648 B2 * | 7/2008 | Kondo et al. | 361/502 |
| 7,983,021 B2 | 7/2011 | Reddy et al. | 361/502 |

(Continued)

FOREIGN PATENT DOCUMENTS

| JP | 08107047 A | * | 4/1996 |
|---|---|---|---|
| JP | 09063908 A | * | 3/1997 |

OTHER PUBLICATIONS

Takeshi Fujino et al, Honda R&D Company Ltd, "Characterization of advanced mesophase carbons using novel mass production method," 15th Int'l Seminar on Double Layer Capacitors, Dec. 5-7, 2005, pp. 79-96.

(Continued)

*Primary Examiner* — Eric Thomas
(74) *Attorney, Agent, or Firm* — Michael Russell

(57) ABSTRACT

A package for an electrochemical double layer capacitor includes a housing defining an interior volume, the housing having an end wall, side walls, and an end cap configured to sealably engage with the side walls to enclose the interior volume, wherein the interior volume has a height ($h_{can}$) and a diameter ($d_{can}$) such that an aspect ratio defined as $h_{can}/d_{can}$ is for an electrochemical double layer capacitor having a specific capacitance of at least 100 F. An electrode set adapted to be incorporated into the package can have an aspect ratio in a range of 3.1 to 15 and a specific capacitance of at least 100 F.

18 Claims, 22 Drawing Sheets

(56) References Cited

U.S. PATENT DOCUMENTS

| | | | |
|---|---|---|---|
| 2004/0114309 A1 | 6/2004 | Iwaida et al. | 361/508 |
| 2006/0118755 A1* | 6/2006 | Fujioka et al. | 252/62.2 |
| 2006/0240979 A1* | 10/2006 | Hirahara et al. | 502/416 |
| 2008/0259525 A1* | 10/2008 | Guillet et al. | 361/502 |
| 2009/0109600 A1* | 4/2009 | Reddy et al. | 361/502 |
| 2009/0279232 A1 | 11/2009 | Druding et al. | 361/528 |
| 2010/0033900 A1* | 2/2010 | Miura et al. | 361/502 |
| 2010/0150814 A1 | 6/2010 | Gadkaree et al. | 423/445 R |
| 2010/0151328 A1 | 6/2010 | Gadkaree et al. | 429/231.8 |
| 2010/0321864 A1* | 12/2010 | Azais et al. | 361/502 |
| 2011/0182000 A1 | 7/2011 | Gadkaree et al. | 361/502 |
| 2011/0256438 A1 | 10/2011 | Taguchi et al. | 429/94 |

OTHER PUBLICATIONS

PCT Application No. PCT/US2012/065443, Filed Nov. 16, 2012, PCT Search Report dated May 24, 2013.

* cited by examiner

CELL DESIGN FOR HIGH ENERGY DENSITY ELECTROCHEMICAL DOUBLE LAYER CAPACITORS

This application is a continuation-in-part of U.S. patent application Ser. No. 13/297,847 filed on Nov. 16, 2011 now abandoned, now abandoned the content of which is relied upon and incorporated herein by reference in its entirety, and the benefit of priority under 35 U.S.C. §120 is hereby claimed.

BACKGROUND

The present disclosure relates generally to electrochemical double layer capacitors, and more particularly to cell and package designs to facilitate high energy density output from an EDLC.

Energy storage devices such as electrochemical double layer capacitors (EDLCs), which are also referred to as ultracapacitors or supercapacitors, may be used in a variety of applications where a discrete power pulse is required. Such applications range from cell phones to hybrid vehicles. Ultracapacitors can include two or more carbon-based electrodes separated by a porous separator and an organic electrolyte. The foregoing active components, which define an electrode set, can be arranged in a variety of configurations. Example configurations include parallel plate and jelly roll designs. In use, the active components are contained within a housing or package.

Important characteristics of an ultracapacitor are the energy density and the power density that it can provide. The energy density and the power density are largely determined by the properties of the active components. A further important characteristic is cost. Factors that impact the cost of the device include the cost of the raw materials, as well as the direct and indirect costs of the associated packaging, which can impact performance, manufacturability and reliability. It is desirable to make an ultracapacitor package simple and inexpensive while simultaneously robust and efficient.

One aspect of an ultracapacitor package is the efficiency with which the available volume is used to provide the desired energy. By minimizing unused volume within the package, the volumetric energy density of the device can be increased. In view of the foregoing, there is a need for efficient, economical and robust ultracapacitor cell and package designs.

SUMMARY

Disclosed is an electrochemical double layer capacitor having an optimized geometry. In particular, by providing an electrode set (and attendant package) having a high aspect ratio, greater and more efficient utilization of available volume can be achieved resulting in a higher volumetric energy density than is achieved using conventional geometries.

In one embodiment, a cylindrical electrode set for an electrochemical double layer capacitor has a height and a diameter such that an aspect ratio defined as height/diameter is in a range of about 3.1 to 15. For example, a coiled electrode set for an electrochemical double layer capacitor may comprise a first electrode that includes a first current collector having opposing major surfaces, and an activated carbon layer formed over each of the opposing major surfaces of the first current collector, a second electrode that includes a second current collector having opposing major surfaces, and an activated carbon layer formed over each of the opposing major surfaces of the second current collector, and a porous separator positioned between the first and second electrodes, wherein the electrode set has an aspect ratio of greater than 3.1.

In a related embodiment, a package for an electrochemical double layer capacitor comprises a housing defining an interior volume, the housing having an end wall, side walls, and an end cap configured to sealably engage with the side walls to enclose the interior volume, wherein the interior volume has a height ($h_{can}$) and a diameter ($d_{can}$) such that an aspect ratio defined as $h_{can}/d_{can}$ is in a range of about 3.1 to 15.

Embodiments also relate to electrochemical double layer capacitors having the foregoing configurations and further comprising activated carbon having a high volumetric specific capacitance. The overall geometry (of the electrode set and the corresponding package) may be cylindrical, though other prismatic shapes including oblong cross sections are contemplated.

A method of forming a coiled electrode set for an electrochemical double layer capacitor comprises forming a first electrode having a first current collector with opposing major surfaces, and an activated carbon layer formed over each of the opposing major surfaces of the first current collector, forming a second electrode having a second current collector with opposing major surfaces, and an activated carbon layer formed over each of the opposing major surfaces of the second current collector, providing a porous separator between the first and second electrodes, and rolling the first electrode, second electrode and separator to form a coiled electrode set, where the electrode set has an aspect ratio greater than 3.1.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

The performance of an electrochemical double layer capacitor (EDLC) can be characterized by plotting energy density as a function of power density. The resulting graphic is referred to as a Ragone plot.

Figure 1:
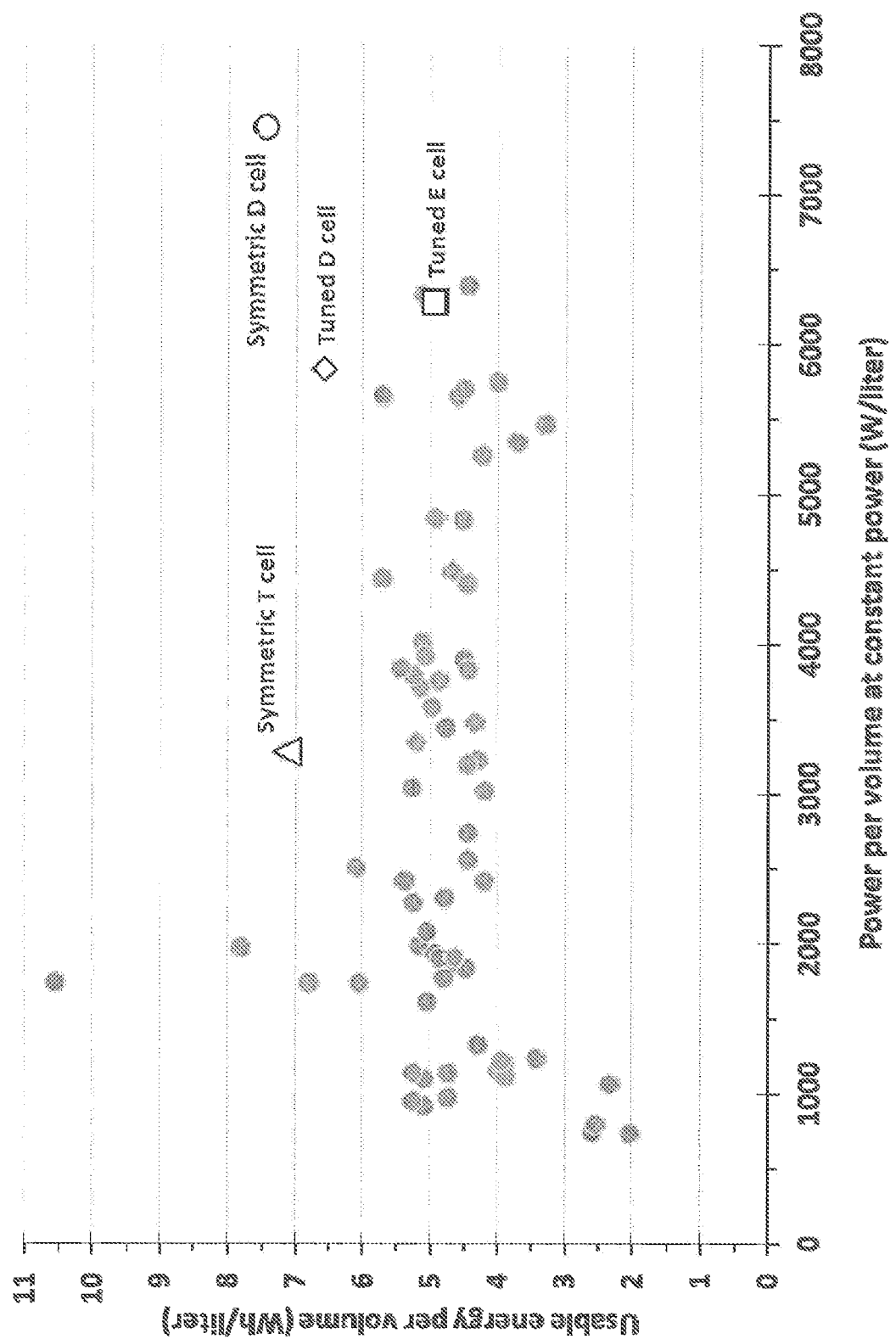
FIG. 1 is a Ragone plot of data from comparative and inventive EDLCs.

An example Ragone plot of volumetric energy density versus volumetric power density is shown in FIG. 1. The plotted data summarize various comparative, commercially-available or published prototype cells (gray dots) where each data point represents a cylindrical cell having a cell capacitance of at least 100 F and a maximum cell voltage greater than 2.5V. Each commercially-available cell is calculated to have a non-zero discharge power after 5 seconds of constant current discharge at I=0.2 $C_{cell}$ amps.

The commercially-available cells are believed to have sufficiently high cell capacitances and appropriate RC time constant values (~1 second) for emerging automotive energy storage system applications.

Also plotted in FIG. 1 are four example cells operating at $V_{max}$=2.7V. The example data include "D cells" having both symmetric and tuned electrode architectures, a "T cell" having a symmetric electrode architecture, and an "E cell" having a tuned electrode architecture. As used herein, a symmetric electrode architecture means that the activated carbon that is incorporated into the positive electrode(s) of the cell is substantially identical to the activated carbon that is incorporated into the negative electrode(s) of the cell. Reference to an EDLC having tuned or asymmetric electrodes means that the activated carbon material that is incorporated into the positive and negative electrodes of the cell has been engineered specifically for that specific electrode. Additional aspects of providing an EDLC comprising a tuned (or asymmetric) electrode architecture are disclosed in commonly-owned U.S. patent application Ser. No. 13/081,898, the entire contents of which are incorporated herein by reference.

With reference to the inventive data in FIG. 1, the estimated electrode specific capacitance for each of the symmetric cells is about 88 F/cm$^3$, while the specific capacitance for the asymmetric cells is about 88 F/cm$^3$ in one electrode and about 65 F/cm$^3$ in the other. As can be seen with reference to FIG. 1, the energy densities of the D cell and E cell using tuned carbon electrodes are noticeably different. This difference, where the cells have a similar electrode configuration, can be explained by the difference in design geometry of the cells.

Figure 2:
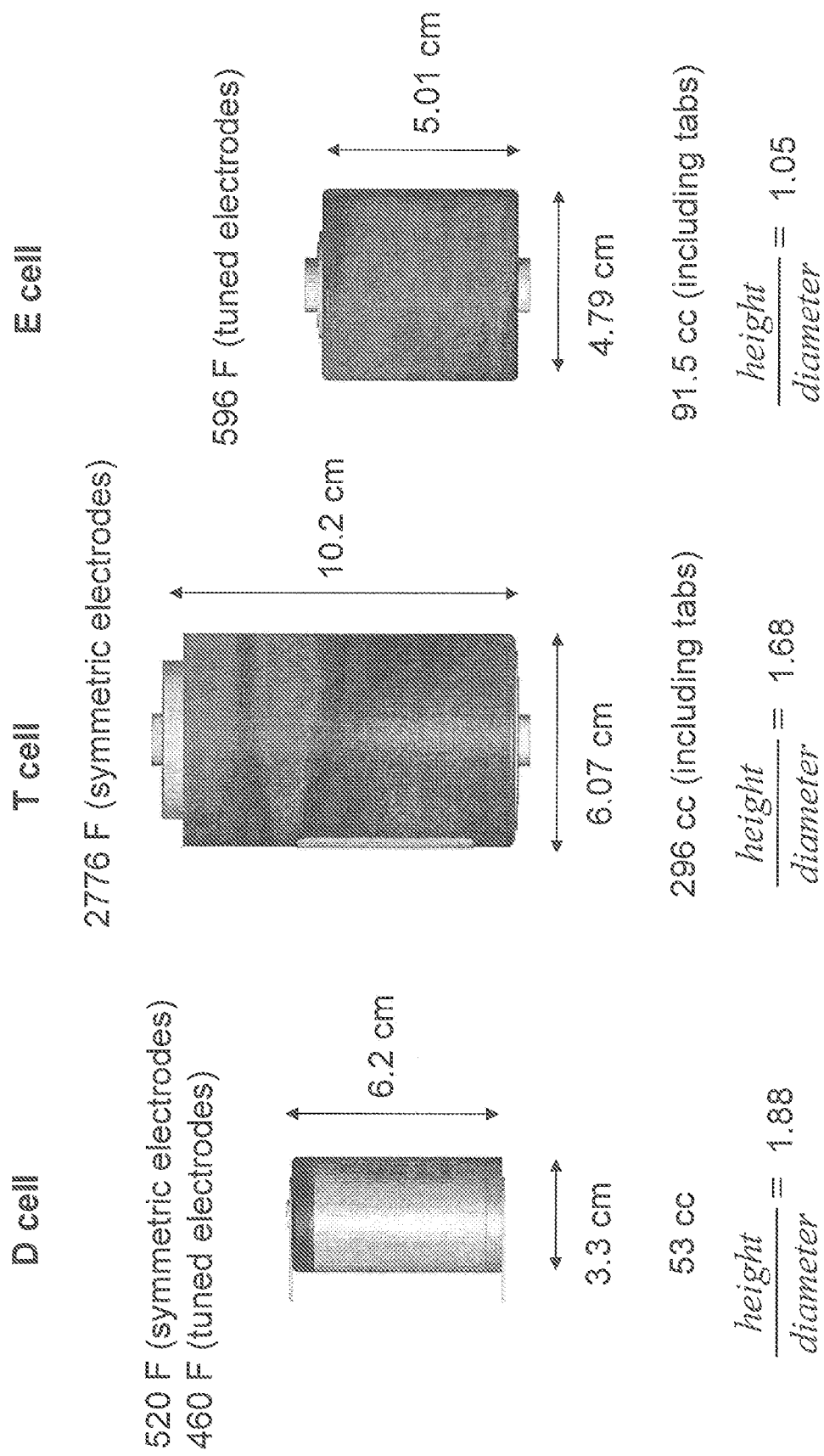
FIG. 2 is a schematic of EDLC geometries according to various embodiments.

The specific shapes and dimensions of the D, T and E cells are illustrated in FIG. 2. The aspect ratio (AR) of a cylindrical can is defined as the ratio of the can height to the can diameter. In embodiments, the referenced height and diameter are the internal height and internal diameter. The D cell has an aspect ratio of about 1.9, while the T and E cells have aspect ratios of about 1.7 and 1.1, respectively. Herein, the terms "package" and "can" are used interchangeably.

As is the case for the cylindrical can, the aspect ratio of a cylindrical electrode set (e.g., jelly roll) that is configured to be incorporated into such a can is defined as the ratio of the electrode set height to the electrode set diameter. For a jelly roll design, the height is measured parallel to the rolling axis, while the diameter is measured perpendicular to the rolling axis. For non-cylindrical geometries (e.g., oblong or square), the aspect ratio is defined as the ratio of the height to the effective diameter. The effective diameter is the diameter of a hypothetical circle that has an area equal to the actual cross-sectional area of the non-cylindrical shape. For example, an oblong cell has an actual cross-sectional area equal to $\pi d_1 d_2/4$, where $d_1$ and $d_2$ are the lengths of the major and minor axes of the corresponding ellipse. An oblong cell having major and minor axes of 4 inches and 3 inches has an end face area of $3\pi$ in$^2$ and effective diameter of $2\sqrt{3}$ in. As disclosed herein, the achievable volumetric energy density and volumetric power density are related to the aspect ratio of the cell and the package that encloses the cell.

An EDLC electrode set comprises a number of layers (electrode, current collector, separator) that are stacked together and rolled up to be placed inside a suitable package. A model of a cylindrical EDLC, for example, can be constructed by considering the geometry of the unrolled layers making up the jelly roll. The unrolled cell geometry is shown in FIG. 3.

Each layer has a height $h_{roll}$ and a length $l_{roll}$ (each measured in cm). In the model that follows, it is assumed that both separators have the same thickness $t_{sep}$. It is also assumed that both current collectors have the same thickness $t_{cc}$. The thicknesses are also measured in centimeters. There are two pairs of carbon electrodes. The first electrode has two carbon layers of thickness $t_{elec-1}$, which are formed over either side of a current collector of thickness $t_{cc}$. The first electrode has a specific capacitance $\sigma_{elec-1}$ (in F/cm$^3$). The second electrode has a two carbon layers of thickness $t_{elec-2}$ formed over either side of a current collector of thickness $t_{cc}$. The second electrode has specific capacitance $\sigma_{elec-2}$ (in F/cm$^3$).

The two electrodes are separated by two separator layers of thickness $t_{sep}$. The jelly roll volume $v_{roll}$ can be calculated as $$v_{roll} h_{roll} l_{roll} (2t_{elec-1} + 2t_{cc} + 2t_{sep} + 2t_{elec-2})$$

Figure 3:
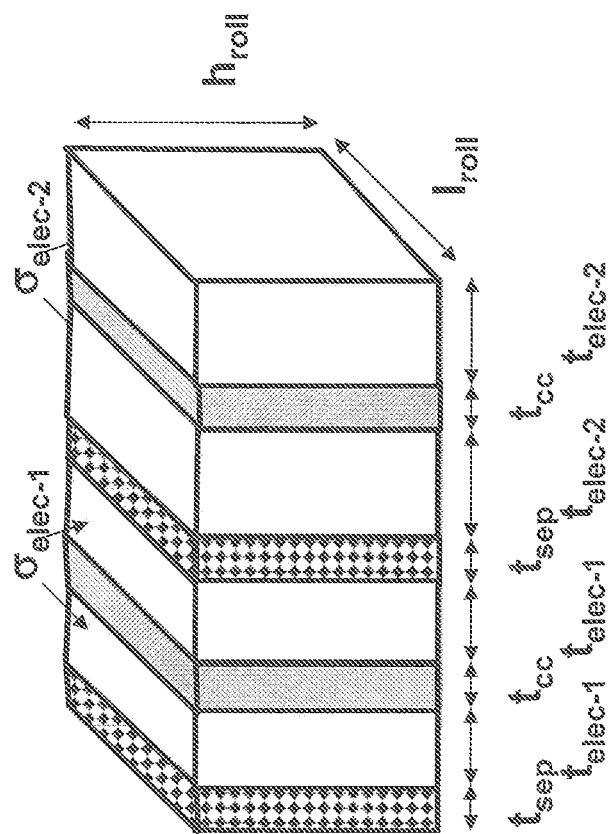
FIG. 3 is a schematic showing the unrolled layers of an example EDLC.
Figure 4:
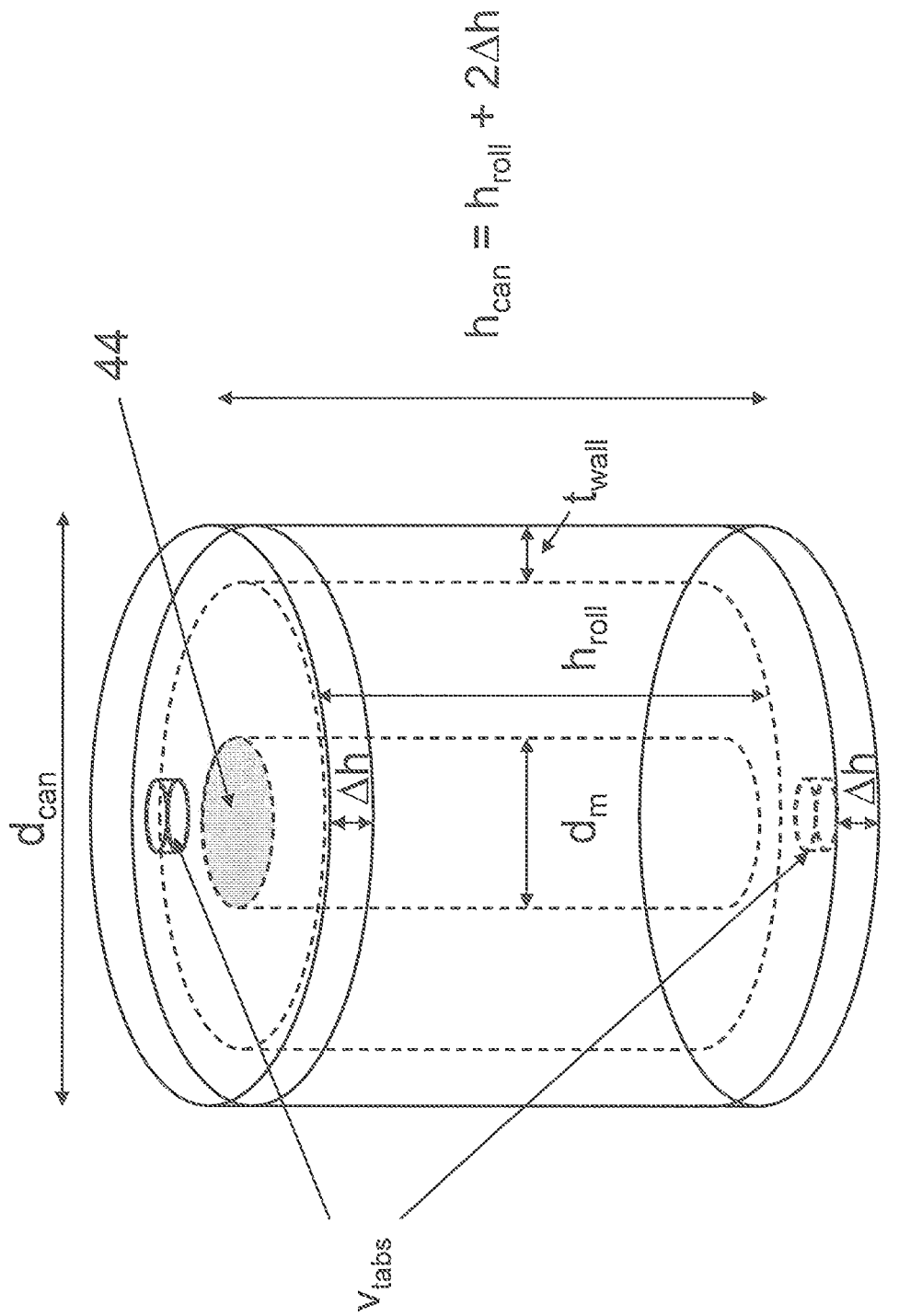
FIG. 4 shows the modeled dimensions of a cylindrical EDLC.

A cylindrical geometry can be formed by taking the unrolled layers shown in FIG. 3 and rolling them up, as illustrated in FIG. 4. Typically, to form the jelly roll, the layers are wrapped around a mandrel, which when removed leaves a cylindrical void 44 in the middle of the jelly roll. The void has a diameter $d_m$. In embodiments, the mandrel void diameter is less than 20% of the diameter of the coiled electrode set, e.g., less than 20, 15, 10 or 5% of the electrode set total diameter.

Figure 5:
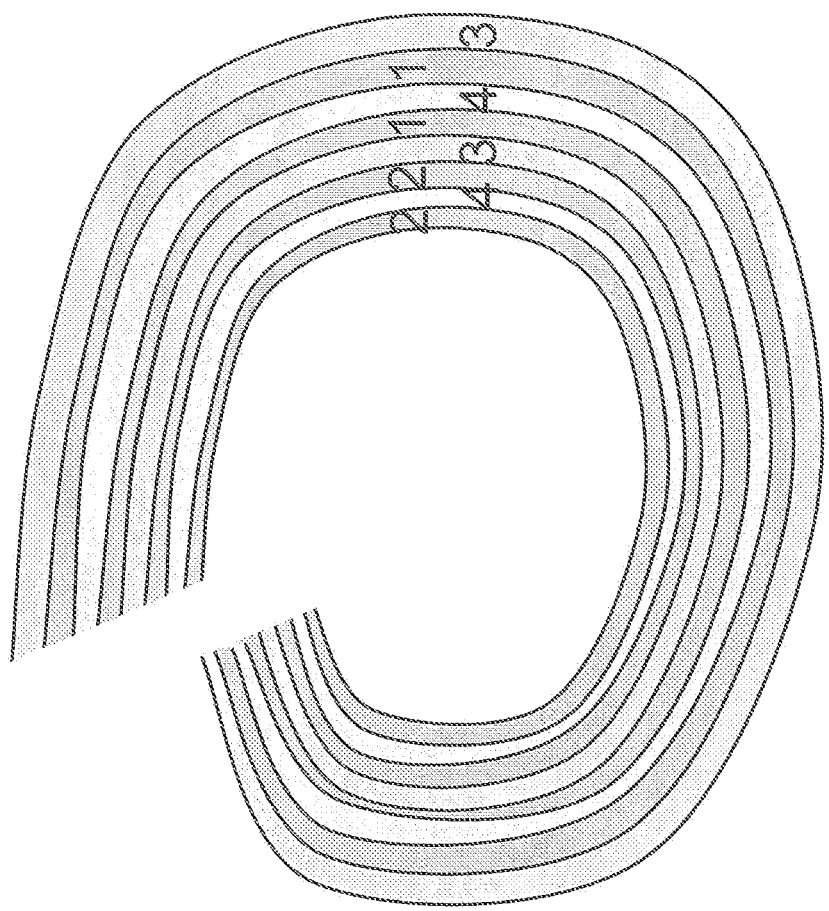
FIG. 5 illustrates edge effects in a cylindrical EDLC.

During the wrapping, the capacitance of the layers is reduced in the first wrap (on the inside of the jelly roll edge facing the mandrel void) as well as in the last wrap (on the outside of the jelly roll edge facing the inside of the can) due to the absence of an opposite polarity electrode. These edge effects are illustrated in FIG. 5, which shows a partially rolled electrode set comprising first and second current collectors 4,4 where each current collector has a pair of activated carbon layers 1,1 and 2,2 formed over each major surface. A pair of separator layers 3,3 is used to separate the respective electrodes. As can be appreciated from FIG. 5, the capacitance of electrode 2 is reduced by the capacitance loss of one thickness of electrode 2 around the first turn, and the capacitance of electrode 1 is reduced by the capacitance loss of one thickness of electrode 1 around the last turn.

The length of the first turn $l_{first}$ is $l_{first}=\pi d_m$, and the length of the last turn $l_{last}$ is $l_{last}=\pi(d_{can}-2t_{wall})$, where $t_{wall}$ is the thickness of the cylinder wall, plus any tolerance inside the can to fit the jelly roll (if necessary). The height of the jelly roll is defined in a direction that spans the distance between opposing terminals of the device (i.e., an axial direction), while the diameter of the jelly roll is measured in a radial direction.

The cell capacitance is a function of the capacitances of the individual electrodes.

$$\frac{1}{C_{cell}} = \frac{1}{C_{elec-1}} + \frac{1}{C_{elec-2}}$$

The capacitance of electrode 1 can be expressed as a function of its specific capacitance $\sigma_{elec-1}$ (in F/cc) and the volume of electrode 1 that contributes to capacitance.

$$C_{elec-1} = \sigma_{elec-1} h_{roll} t_{elec-1} (l_{roll} + l_{roll} - l_{last})(10^{-4} \text{ cm/}\mu\text{m})$$

Similarly, the capacitance of electrode 2 can be expressed as a function of its specific capacitance $\sigma_{elec-2}$ (F/cc) and the volume of electrode 2 that contributes to capacitance.

$$C_{elec-2} = \sigma_{elec-2} h_{roll} t_{elec-2} (l_{roll} + l_{roll} - l_{last})(10^{-4} \text{ cm/}\mu\text{m})$$

Substituting these expressions and rearranging yields $$\sigma_{F-roll} = \frac{C_{cell}}{v_{roll}} = \frac{1}{\frac{1}{\sigma_{elec-1}\eta_{elec-1}\left(1-\frac{l_{last}}{2l_{roll}}\right)} + \frac{1}{\sigma_{elec-2}\eta_{elec-2}\left(1-\frac{l_{first}}{2l_{roll}}\right)}}$$

where (from FIG. 3)

$$\eta_{elec-1} = \frac{t_{elec-1}}{t_{elec-1}+t_{cc}+t_{sep}+t_{elec-2}}$$

$$\eta_{elec-2} = \frac{t_{elec-2}}{t_{elec-1}+t_{cc}+t_{sep}+t_{elec-2}}$$

Equating the unrolled volume of the jelly roll $$v_{roll} = h_{roll} l_{roll}(2t_{elec-1}+2t_{sep}+2t_{cc}+2t_{elec-2})(10^{-4} \text{ cm/}\mu\text{m})$$

to the volume bounded by the cylinders of diameters $d_m$ and $(d_{can}-2t_{wall})$ $$v_{roll} = h_{roll}\frac{\pi}{4}((d_{can}-2t_{wall})^2 - d_m^2)$$

gives a value for $l_{roll}$ $$l_{roll} = \frac{\pi((d_{can}-2t_{wall})^2 - d_m^2)}{8(t_{elec-1}+t_{sep}+t_{cc}+t_{elec-2})\left(10^{-4}\frac{\text{cm}}{\mu\text{m}}\right)}$$

Hence $$\sigma_{F-roll} = \frac{1}{\frac{1}{\sigma_{elec-1}\eta_{elec-1}f_{last}} + \frac{1}{\sigma_{elec-2}\eta_{elec-2}f_{first}}}$$

where $$f_{last} = 1 - \frac{4(d_{can}-2t_{wall})(t_{elec-1}+t_{sep}+t_{cc}+t_{elec-2})}{(d_{can}-2t_{wall})^2 - d_m^2}(10^{-4}\text{cm/}\mu\text{m})$$

and $$f_{first} = 1 - \frac{4d_m(t_{elec-1}+t_{sep}+t_{cc}+t_{elec-2})}{(d_{can}-2t_{wall})^2 - d_m^2}(10^{-4}\text{cm/}\mu\text{m})$$

By defining the desired cell capacitance and component parameters, one can derive the jelly roll volume used to form the EDLC $$v_{roll} = \frac{C_{cell}}{\sigma_{F-roll}}$$

For an EDLC with two electrodes of differing specific capacitance ($\sigma_{elec-1} \neq \sigma_{elec-2}$), but equivalent thicknesses ($t_{elec-1}=t_{elec-2}$), because of the circumferential asymmetry between the first wrap and the last wrap, there is a slight variation in the overall capacitance depending on which electrode is chosen for electrode 1 versus electrode 2. Consider an example where $\sigma_{elec-1}$=88 F/cm$^3$, $\sigma_{elec-2}$=65 F/cm$^3$, $\eta_{elec-1}=\eta_{elec-2}$=38.5%, $f_{last}$=0.977 and $f_{first}$=0.997. The calculated jelly roll specific capacitance $\sigma_{F-roll}$=14.23 F/cm$^3$.

If the specific capacitances of electrode 1 and electrode 2 were switched (i.e. $\sigma_{elec-1}$=65 F/cm$^3$ and $\sigma_{elec-2}$=88 F/cm$^3$), the calculated jelly roll specific capacitance becomes 14.19 F/cm$^3$. The difference is small (0.3%) but potentially significant. Based on the foregoing, to maximize the jelly roll (and cell) specific capacitance, one would choose electrode 1 (as shown in FIG. 5) to have the larger specific capacitance (presuming both electrodes have the same thickness). Thus, in embodiments, the unpaired electrode at the inner radius of the coiled electrode set can have a smaller specific capacitance than the unpaired electrode at the outer radius of the coiled electrode set.

The volume of the EDLC cell is larger than the jelly roll volume, because of packaging factors. For cylindrical cells, these packaging factors include extra height $\Delta h$ at the top and the bottom of the cell to allow interconnection of the wrapped jelly roll to terminals, plus the terminals themselves, an open space in the center of the jelly roll of diameter $t_m$ resulting from winding the roll around a mandrel, the finite thickness of the tubular walls (and tolerance for fitting jelly roll into the can) $t_{wall}$ making up the sides of the cylinder, and the volume of tabs, if present, that extend beyond the volume of the package.

The can volume $v_{can}$ (in cc) is a function of the cell height $h_{can}$ and the can diameter $d_{can}$.

$$v_{can} = \frac{\pi}{4} d_{can}^2 h_{can}$$

The extra height $\Delta h$ (in cm) added to the top and the bottom of the can leads to a relationship between the height of the jelly roll and the height of the can.

$$h_{can} = h_{roll} + 2\Delta h$$

This extra height is typically needed to accommodate the current collectors that are electrically connected to the top and bottom of the can.

The extra volume of the two caps $v_{cap}$ above and below the jelly roll may be expressed as $$v_{cap} = \frac{\pi}{2} d_{can}^2 \Delta h$$

The extra volume in the center of the jelly roll $v_m$ to account for winding the roll around a mandrel may be expressed as $$v_m = \frac{\pi}{4} d_m^2 h_{roll}$$

This can be re-expressed in terms of a volume arising from an annulus of thickness $t_{m-eq}$ and outer diameter $$d_{m-eq} = d_{can} - 2t_{wall}$$

The mandrel volume may be expressed by $$v_m = \frac{\pi}{4} d_m^2 h_{roll} = \pi d_{m-eq} t_{m-eq} h_{roll}$$

Rearranging, $$t_{m-eq} = \frac{d_m^2}{4(d_{can} - 2t_{wall})}$$

Figure 6:
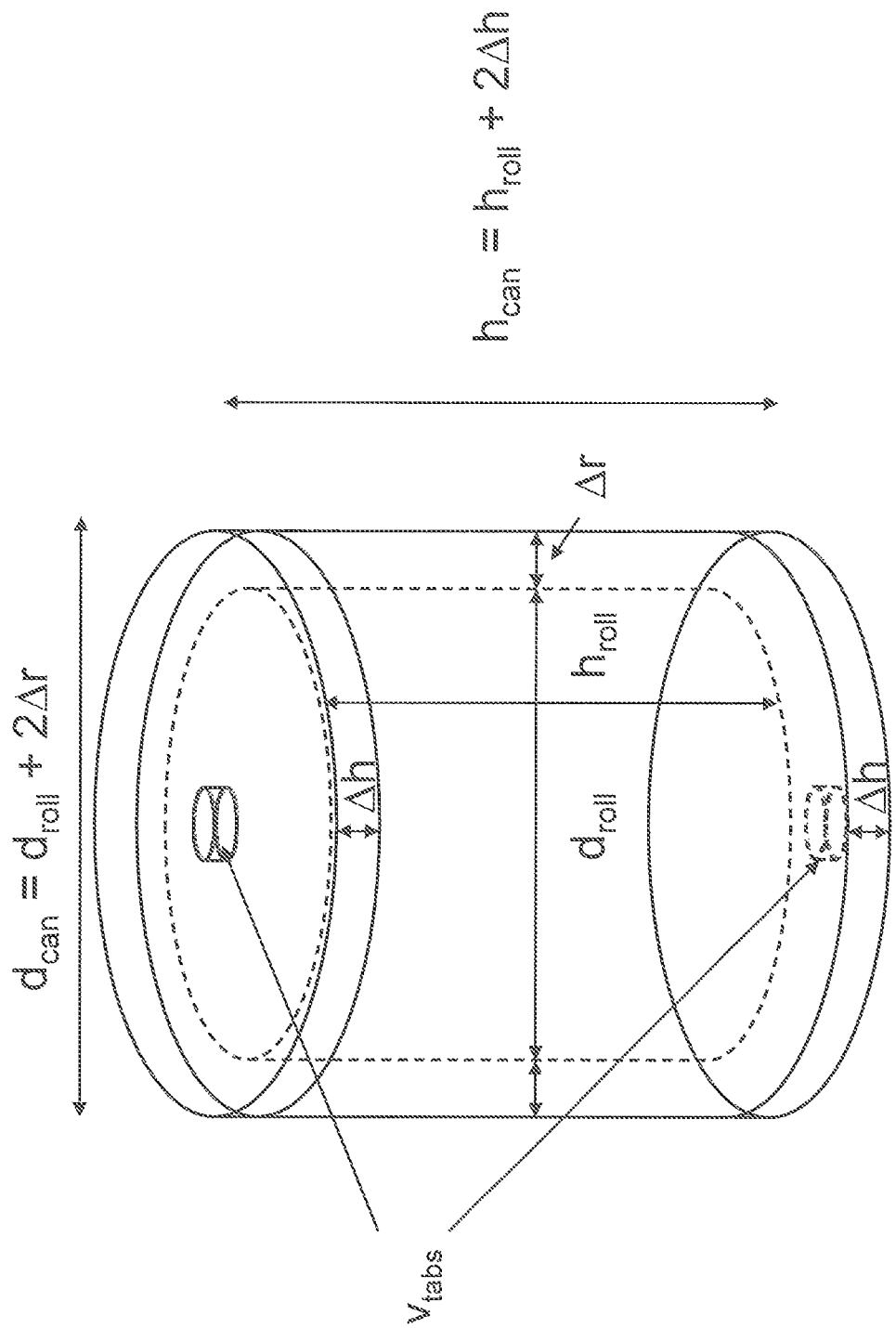
FIG. 6 shows a simplified model of a cylindrical EDLC.

With this representation, the EDLC may be modeled as a solid cylinder of volume $v_{roll}$, surrounded by a layer having total outer thickness $\Delta r$ plus the volume of the two end caps and the two tabs (if present). This is illustrated in FIG. 6. Tabs can be added to the top and the bottom of the can to promote a robust electrical connection. The sum of the volume of all tabs present is represented by volume $v_{tabs}$. The total cell volume becomes $$v_{cell} = v_{roll} + \frac{\pi}{4}(d_{can}^2 - (d_{can} - 2\Delta r)^2)(h_{can} - 2\Delta h) + \frac{\pi}{2} d_{can}^2 \Delta h + v_{tabs}$$

where $$\Delta r = t_{m-eq} + t_{wall}$$

Consider a cell that is designed with chosen values for $\sigma_{elec-1}$, $\eta_{elec-1}$, $f_{elec-1}$, $\sigma_{elec-2}$, $\eta_{elec-2}$, and $f_{elec-2}$ such that one can calculate $$\sigma_{F-roll} = \frac{1}{\frac{1}{\sigma_{elec-1} \eta_{elec-1} f_{last}} + \frac{1}{\sigma_{elec-2} \eta_{elec-2} f_{first}}}$$

One then selects a cell capacitance $C_{cell}$, from which one can calculate $$v_{roll} = \frac{C_{cell}}{\sigma_{F-roll}}$$

From the geometry shown in FIG. 6, the following holds $$h_{roll} = \frac{v_{roll}}{\frac{\pi}{4} d_{roll}^2}$$

Finally, one chooses values for $\Delta h$ and $\Delta r$ that meet the design needs of the cell. The aspect ratio AR of an EDLC cell is defined as the ratio of the can height to the can diameter.

$$AR = \frac{h_{can}}{d_{can}} = \frac{h_{roll} + 2\Delta h}{d_{roll} + 2\Delta r}$$

The earlier expression for $h_{roll}$ can be substituted into the previous equation to arrive at $$AR = \frac{\frac{v_{roll}}{\frac{\pi}{4} d_{roll}^2} + 2\Delta h}{d_{roll} + 2\Delta r}$$

Given values for $v_{roll}$, $\Delta h$, and $\Delta r$, the above equation can be rearranged to produce $$a d_{roll}^3 + b d_{roll}^2 + c d_{roll} + d = 0$$

where $$a = \frac{\pi}{4} AR$$

$$b = \frac{\pi}{2}(AR \, \Delta r - \Delta h)$$

$$c = 0$$

$$d = -v_{roll}$$

This cubic equation can be solved for $d_{roll}$ to find $$d_{roll} = -\frac{b}{3a} - \frac{C}{3a} - \frac{b^2 - 3ac}{3aC}$$

where $$C = \sqrt[3]{\frac{1}{2}(Q + 2b^3 - 9abc + 27a^2 d)}$$

$$Q = \sqrt{(2b^3 - 9abc + 27a^2 d)^2 - 4(b^2 - 3ac)^3}$$

Once $d_{roll}$ is known, one can solve for the other dimensions.

$$d_{can} = d_{roll} + 2\Delta r$$

$$h_{roll} = \frac{v_{roll}}{\frac{\pi}{4}d_{roll}^2}$$

$$h_{can} = h_{roll} + 2\Delta h$$

$$v_{can} = \frac{\pi}{4}d_{can}^2 h_{can}$$

The can packaging efficiency $\eta_{can}$ is defined as $$\eta_{can} = \frac{v_{roll}}{v_{can}}$$

The volumetric usable energy density of the jelly roll volume of an EDLC cell $\sigma_{E\text{-}roll}$ (in watt-hours/liter) is defined as the cell's electric energy released in a discharge from its maximum voltage $V_{max}$ to ½ of its maximum voltage.

$$\sigma_{E\text{-}roll} = \frac{\frac{1}{2}C_{cell}\left(V_{max}^2 - \left(\frac{V_{max}}{2}\right)^2\right)}{v_{roll}}\left(\frac{1000\,cc}{l}\frac{hr}{3600\,sec}\right)$$

Substituting in the expression for jelly roll specific capacitance, one arrives at $$\sigma_{E\text{-}roll} = \frac{1}{2}\left(V_{max}^2 - \left(\frac{V_{max}}{2}\right)^2\right)\sigma_{F\text{-}roll}\left(\frac{1000\,cc}{l}\frac{hr}{3600\,sec}\right)$$

The can volumetric usable energy density $\sigma_{E\text{-}can}$ is calculated as $$\sigma_{E\text{-}can} = \eta_{can}\sigma_{E\text{-}roll}$$

The cell volume is made up of the can volume plus the volume of the tabs.

$$v_{cell} = v_{can} + v_{tabs}$$

This can be rewritten as $$\frac{v_{can}}{v_{cell}} = \frac{1}{1 + \frac{v_{tabs}}{v_{can}}}$$

The cell volumetric usable energy density $\sigma_E$ can be calculated as $$\sigma_E = \sigma_{E\text{-}can}\frac{v_{can}}{v_{cell}} = \frac{\eta_{can}\sigma_{E\text{-}roll}}{1 + \frac{v_{tabs}}{v_{can}}}$$

Changing the aspect ratio (AR) changes the can packing density $\eta_{can}$, which in turn changes the cell volumetric usable energy density, $\sigma_E$.

Next, consider the effect of aspect ratio on power density. There are four noticeable contributions to the equivalent series resistance of the cell ESR (in milli-ohms), which can be expressed as $$ESR = 2R_{cap\text{-}cc} + 2R_{cc} + 2R_{cc\text{-}E} + R_{ionic}$$

where $R_{cap\text{-}cc}$ is the contact resistance between the end-cap and the current collector, $R_{cc}$ is the resistance of the current collector layer, $R_{cc\text{-}E}$ is the contact resistance between a current collector and electrode layer, and $R_{ionic}$ is the equivalent resistance of electrolyte ions.

Figure 7:
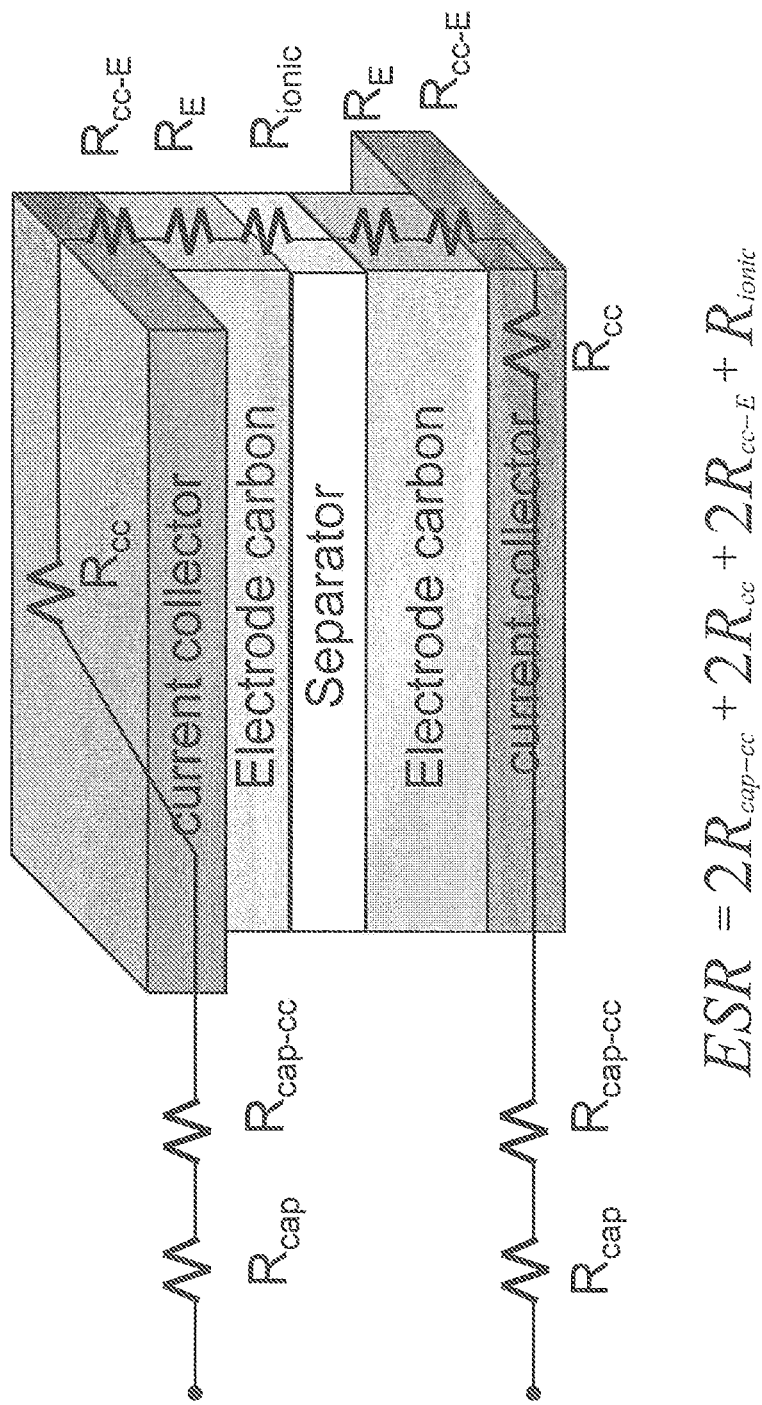
FIG. 7 is a 3-resistor model of a typical jelly roll EDLC.

These factors are illustrated in FIG. 7 and are discussed below. For designs with current collectors that overhang the jelly roll on either end, and which are then welded to their respective endcaps, the contact resistance may be written as $$R_{cap\text{-}cc} = \frac{r_{cap\text{-}cc}}{A_{cap\text{-}cc}}\frac{10000\,cm^2}{m^2}\frac{1000\,m\Omega}{\Omega}$$

where $r_{cap\text{-}cc}$ is the contact resistivity between end-cap and current collector (in ohm-m$^2$) and $A_{cap\text{-}cc}$ is the contact area of end-cap and current collector (in cm$^2$).

The contact area can be approximated as two or three strips running the length of jelly roll radius $$A_{cap\text{-}cc} = t_{cap\text{-}cc}\frac{d_{roll}}{2}$$

where $t_{cap\text{-}cc}$ is the equivalent thickness of combined contact strips between end-cap and current collector (in cm).

The best fit for a conventional device from computer modeling yields $r_{cap\text{-}cc} = 3.61\,(10^{-9})$ ohm-m$^2$. This value was used for modeling all subsequent EDLCs.

The resistance of a current collector $R_{cc}$ (in ohms) can be written as $$R_{cc} = \frac{\rho_{cc}\langle d_{e\text{-}cc}\rangle}{l_{roll}t_{cc}}\frac{100\,cm}{m}\frac{10000\,\mu m}{cm}\frac{1000\,m\Omega}{\Omega}$$

where $\rho_{cc}$ is the resistivity of the current collector material (in ohm-m) and $\langle d_{e\text{-}cc}\rangle$ is the average distance traveled by an electron from the current collector/electrode interface to the current collector edge (in cm).

As derived earlier, $$l_{roll} = \frac{\pi((d_{can} - 2t_{wall})^2 - d_m^2)}{8(t_{elec\text{-}1} + t_{sep} + t_{cc} + t_{elec\text{-}2})}\frac{1}{10^{-4}\frac{cm}{\mu m}}$$

The average distance traveled by an electron from the edge of the current collector $\langle d_{e\text{-}cc}\rangle$ is $$\langle d_{e\text{-}cc}\rangle = \frac{h_{roll}}{2} + \Delta h$$

The fraction of the jelly roll taken up by the current collector $\eta_{cc}$ is defined to be $$\eta_{cc} = \frac{t_{cc}}{t_{elec-1} + t_{cc} + t_{sep} + t_{elec-2}}$$

And noting that $$(d_{can} - 2t_{wall})^2 - d_m^2 = d_{roll}^2$$

then $$R_{cc} = \frac{\rho_{cc}\left(\frac{h_{roll}}{2} + \Delta h\right)}{\frac{\pi}{8}\eta_{cc}d_{roll}^2} \frac{100 \text{ cm}}{\text{m}} \frac{1000 \text{ m}\Omega}{\Omega}$$

The contact resistance between the current collector and electrode $R_{cc-E}$ (in ohms) can be estimated as $$R_{cc-E} = \frac{r_{cc-E}}{h_{roll}l_{roll}} \frac{10000 \text{ cm}^2}{\text{m}^2} \frac{1000 \text{ m}\Omega}{\Omega}$$

where $r_{cc-E}$ (in ohm m$^2$) is the contact resistivity between the current collector and electrode.

Substituting in $$h_{roll}l_{roll} = \frac{v_{roll}}{2(t_{elec-1} + t_{sep} + t_{cc} + t_{elec-2})} \frac{1}{10^{-4}\frac{\text{cm}}{\mu\text{m}}}$$

results in $$R_{cc-E} = \frac{2r_{cc-E}(t_{elec-1} + t_{sep} + t_{cc} + t_{elec-2})}{v_{roll}} \frac{10^{-4} \text{ cm}}{\mu\text{m}} \frac{10000 \text{ cm}^2}{\text{m}^2} \frac{1000 \text{ m}\Omega}{\Omega}$$

Computer modeling results shown below assume $r_{cc-E}$=1.5 (10$^{-5}$) ohm-m$^2$ for all EDLCs modeled.

The equivalent resistance of electrolyte ions $R_{ionic}$ (in ohms) will depend on the average distance an ion (cation or anion) travels. This is estimated as $$R_{ionic} = \frac{\rho_{ion}}{h_{roll}l_{roll}}\left(2.3\epsilon_{electrode}^{-1}\left(\frac{t_{elec-1} + t_{elec-2}}{2}\right) + 1.29\epsilon_{separator}^{-1}t_{sep}\right)$$

$$\frac{10^{-6}\text{m}}{\mu\text{m}} \frac{10000 \text{ cm}^2}{\text{m}^2} \frac{1000 \text{ m}\Omega}{\Omega}$$

where $\rho_{ion}$ is the average bulk ionic resistivity of the electrolyte (in ohm-m), $\epsilon_{electrode}$ is the average porosity of the electrode material, and $\epsilon_{separator}$ is the average porosity of the separator material.

This can be rewritten as $$R_{ionic} = \frac{2\rho_{ion}(t_{elec-1} + t_{cc} + t_{sep} + t_{elec-2})}{v_{roll}}$$

$$\left(2.3\epsilon_{electrode}^{-1}\left(\frac{t_{elec-1} + t_{elec-2}}{2}\right) + 1.29\epsilon_{separator}^{-1}t_{sep}\right)$$

$$\left(10^{-6}\frac{\text{m}}{\mu}\right)\left(10^{-4}\frac{\text{cm}}{\mu}\right)\left(\frac{10000 \text{ cm}^2}{\text{m}^2}\right)\left(\frac{1000 \text{ m}\Omega}{\Omega}\right)$$

The average bulk ionic resistivity of TEA-TFB (Et$_4$NBF$_4$) is estimated to be a function of the molarity of the salt solution as $$\rho_{ion} = \frac{1}{4.239\sqrt{M_{electrolyte}} + 1.577}$$

where $M_{electrolyte}$ is the molarity of TEA-TFB salt solution.

Once the cell resistance has been calculated, one can calculate the cell power $P_{cell}$ (in Watts) under constant power discharge to be $$P_{cell} = \eta_{CP}(1 - \eta_{CP})\frac{(V_{max} - V_{min})^2}{ESR} \frac{1000 \text{ m}\Omega}{\Omega}$$

where $\eta_{CP}$ is the round trip energy efficiency for constant power charge and discharge, i.e., the ratio (in %) of the energy delivered by an EDLC to the energy that was supplied to it during a specific discharge/charge cycle, provided that the beginning and ending state-of-charge values for the cycle are identical and $V_{min}$ is the cell voltage at the end of the discharge period.

Computer modeling results cited here assume that $\eta_{CP}$=90% and $V_{min}$=0 V.

The volumetric power density at constant discharge power $\sigma_P$ (in Waiter) becomes $$\sigma_P = \frac{P_{cell}}{v_{can} + v_{tabs}} \frac{1000cc}{l}$$

Figure 8:
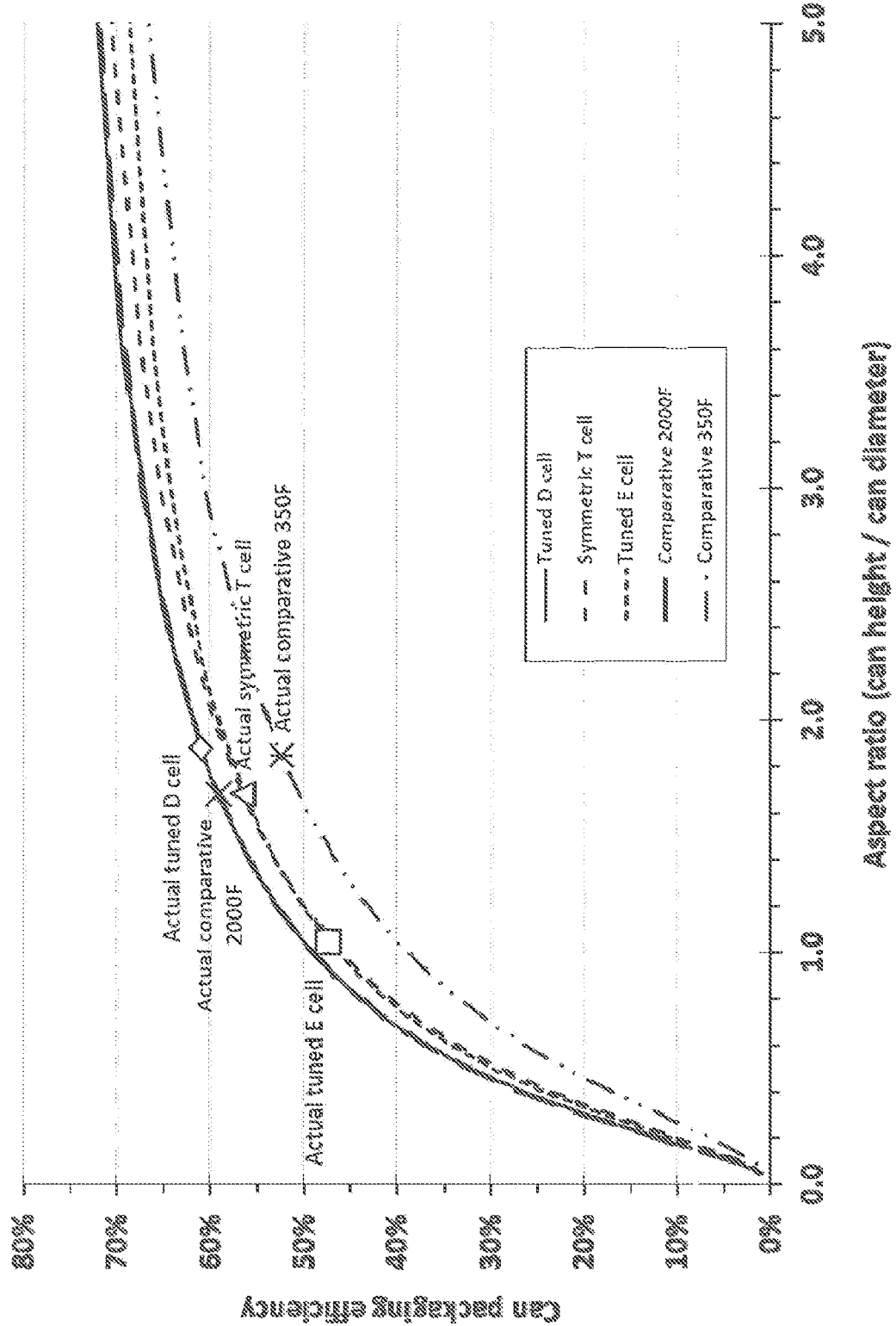
FIG. 8 is a plot of can packaging efficiency versus aspect ratio for example EDLCs.

The modeled can packaging efficiencies of five EDLCs are shown in FIG. 8 as a function of aspect ratio. The diamonds in FIG. 8 represent measured values. The data show that packaging efficiencies can be improved by 15% to 40% by increasing the aspect ratio to at least about 3.1. The can packaging efficiency eventually reaches a maximum, then slowly declines, as the aspect ratio increases. This is illustrated for an example tuned electrode T cell in FIG. 9.

Figure 9:
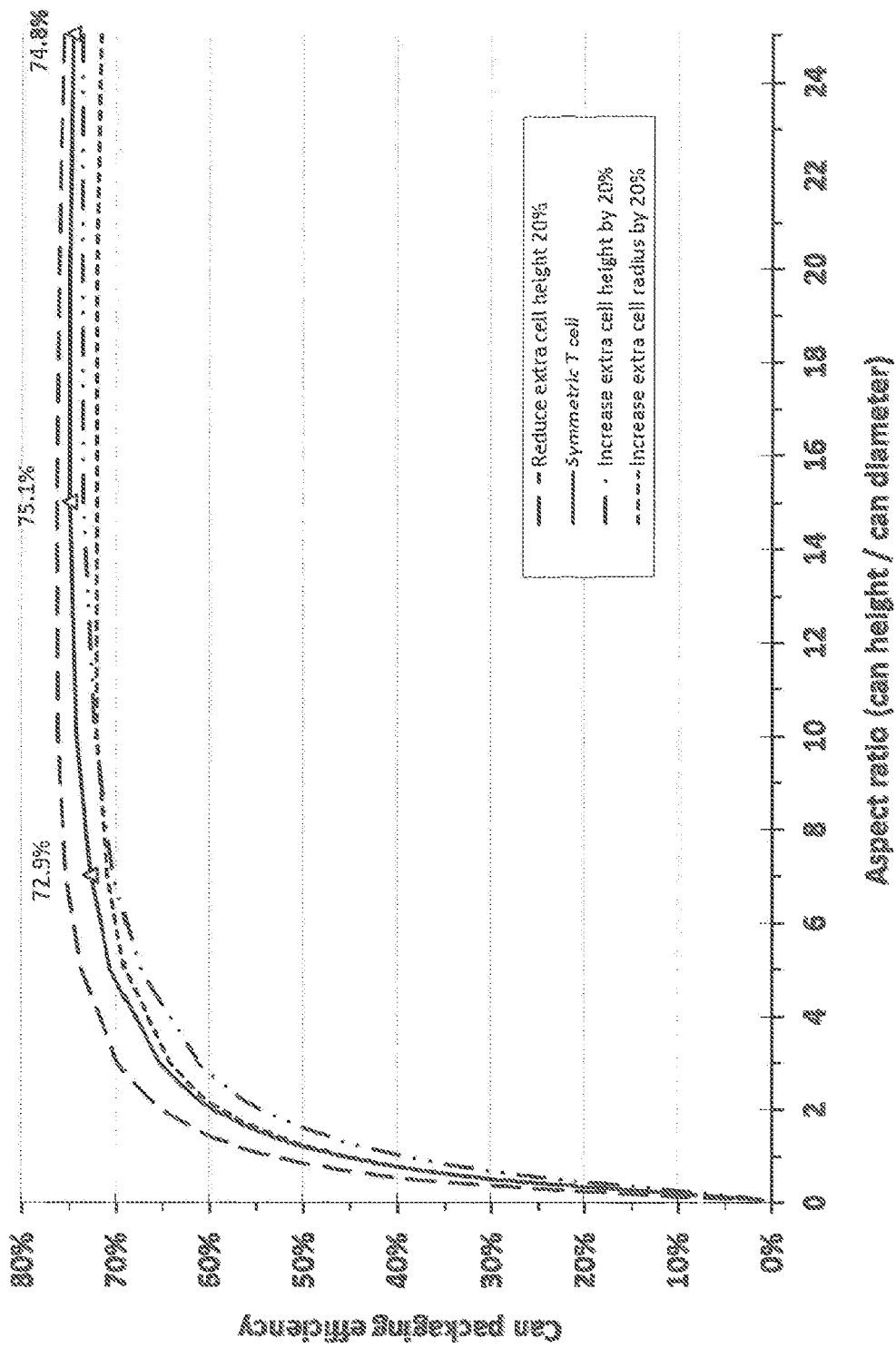
FIG. 9 is a plot of can packaging efficiency versus aspect ratio for example EDLCs showing the impact of specific dimensional changes.

FIG. 9 also shows that at lower aspect ratios (particularly at aspect ratios lower than about 5) it is worthwhile to consider minimizing the extra cell height $\Delta h$, even if it is by a modest fraction (e.g., 20%). For larger aspect ratios (e.g., greater than 5), it is more worthwhile to attempt to minimize the extra cell radius $\Delta r$, even by a modest fraction.

Figure 10:
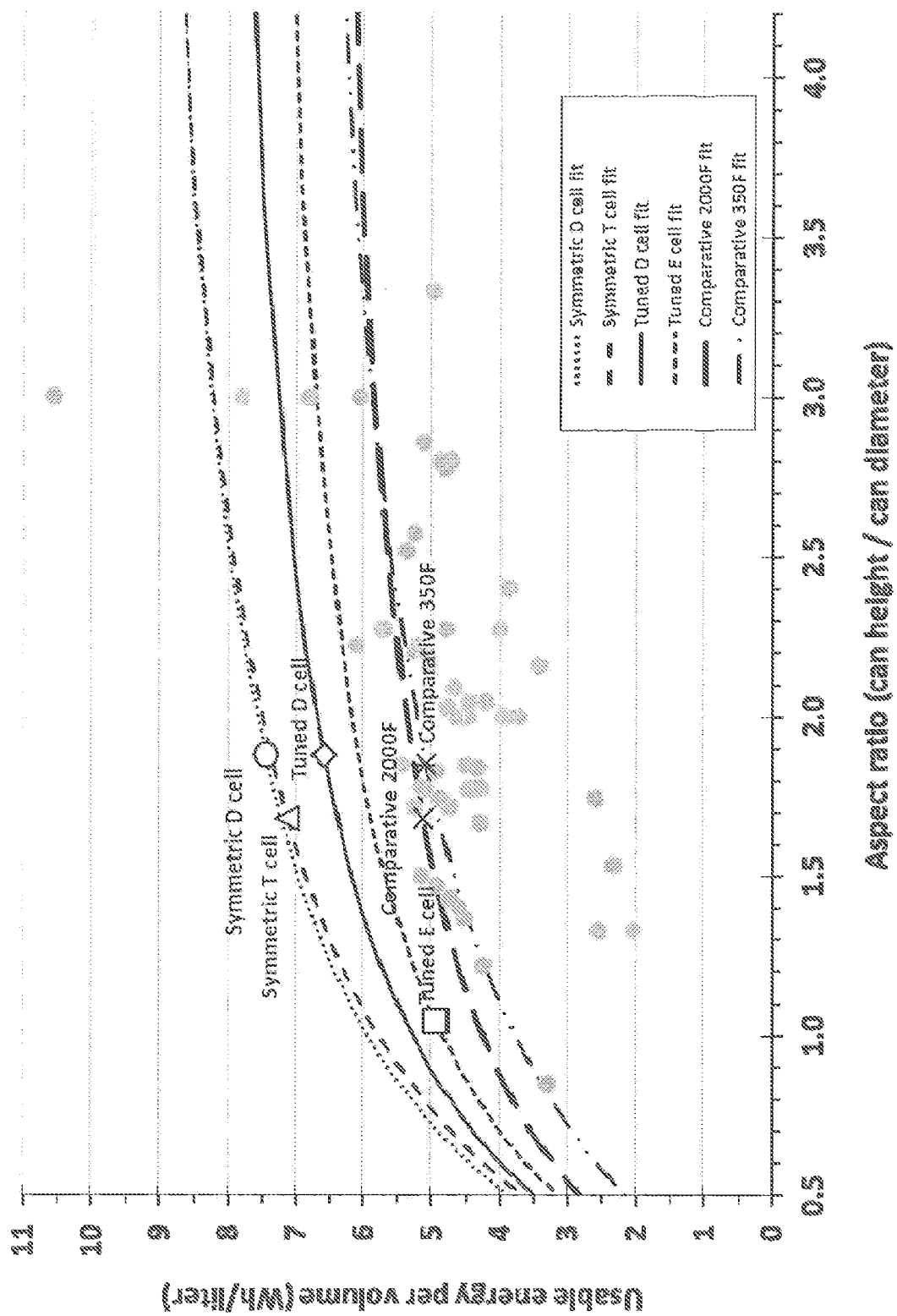
FIG. 10 is a plot of volumetric usable energy density versus aspect ratio.

FIG. 10 shows the volumetric usable energy densities of the EDLCs listed in FIG. 1 as a function of their aspect ratios. The six modeled cells include curves indicating how their volumetric energy densities would increase with increasing aspect ratio. Increasing the aspect ratio does not change the cell capacitance (and hence cell energy), but it does decrease the cell volume (to a point after which the volume increases, as discussed above). Hence the volumetric energy density (energy per volume) typically increases with increasing aspect ratio.

Figure 11:
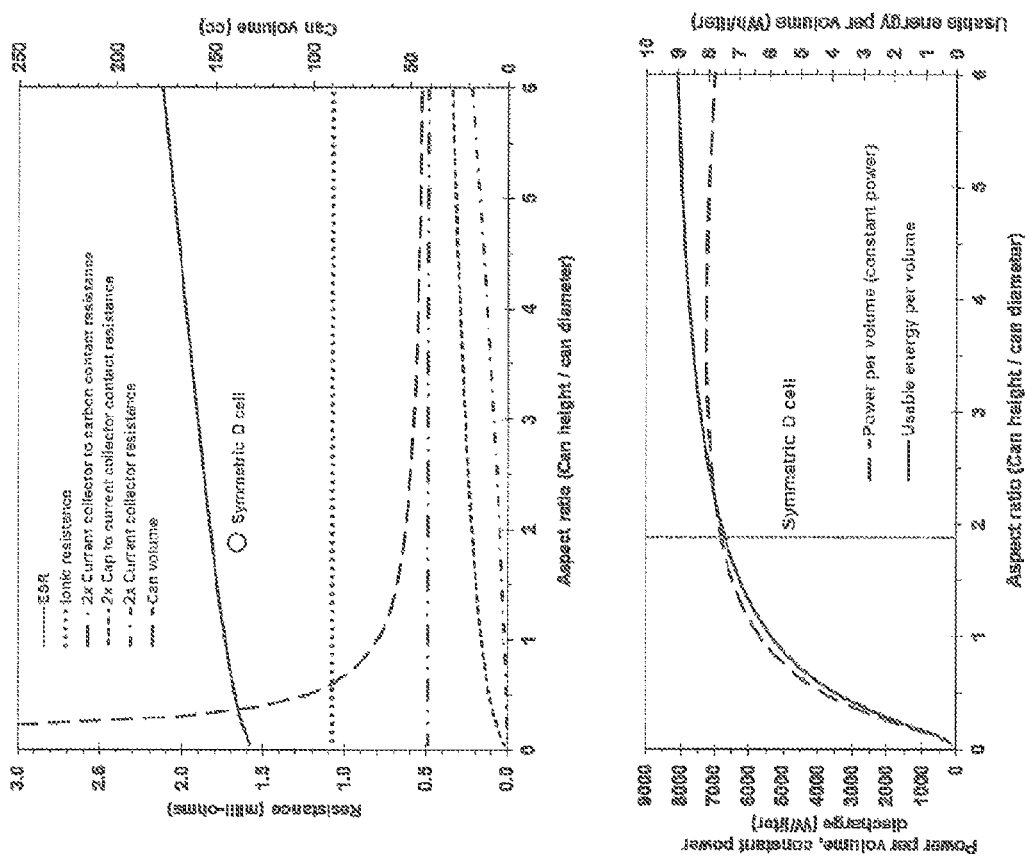
FIG. 11 is a plot of modeled ESR, volumetric energy density and volumetric power density versus aspect ratio for an example symmetric cell according to one embodiment.

FIG. 11 shows the modeling results of the equivalent series resistance of an example symmetric electrode D cell as a function of the aspect ratio of the cell. Also shown is the variation of the constituent resistances making up the cell's ESR. The modeled ESR is 9% higher than the measured ESR, which is a reasonable fit for a simplified resistance model. Note that the cell volume decreases with increasing aspect ratio (though eventually at very high aspect ratios it starts to increase), while two constituents of cell resistance (end-cap to current collector contact resistance and current collector resistance) monotonically increase. As shown in the lower plot, the result is that the volumetric power density of the cell has a maximum value at a particular aspect ratio.

Figure 12:
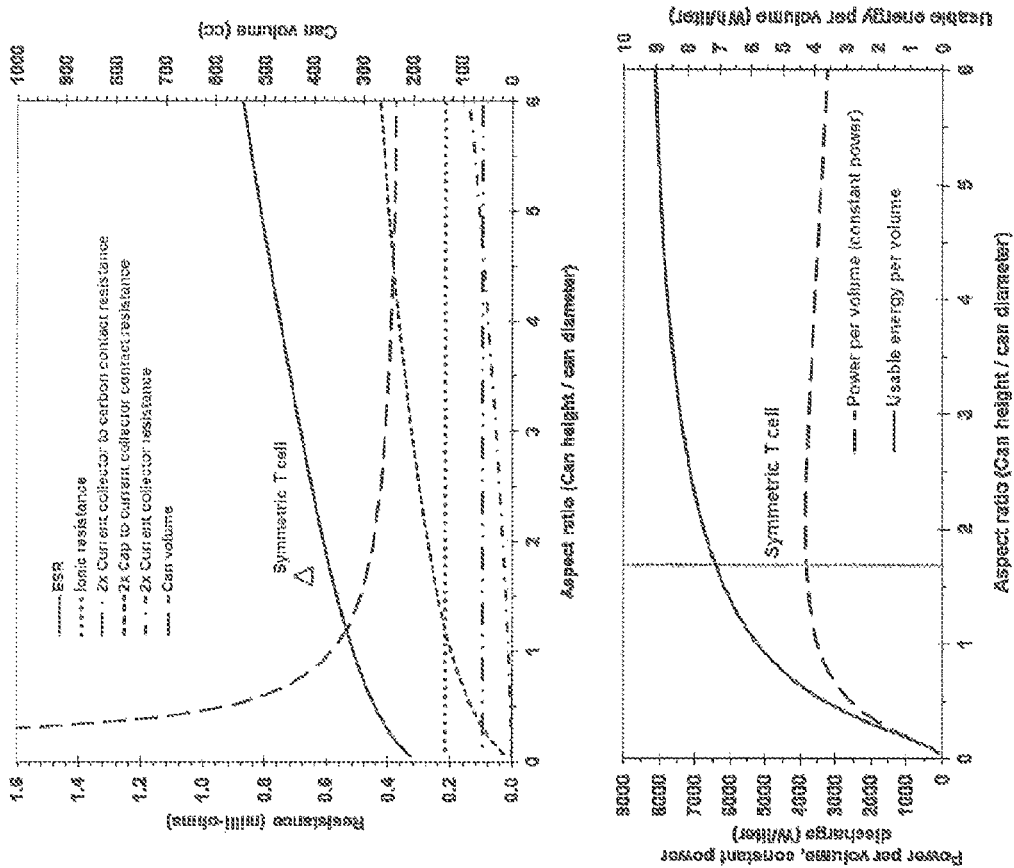
FIG. 12 is a plot of modeled ESR, volumetric energy density and volumetric power density versus aspect ratio for an example symmetric cell according to a further embodiment.

The foregoing leads to an important conclusion for cell design. Higher aspect ratios have diminishing returns for energy density, and eventually are deleterious to the power density. FIG. 12 shows the modeling results for the ESR of an example symmetric electrode T cell. It has the same electrode types as the D cell of FIG. 11, but different dimensions. The modeled ESR in this instance is 14% lower than the measured ESR.

Figure 13:
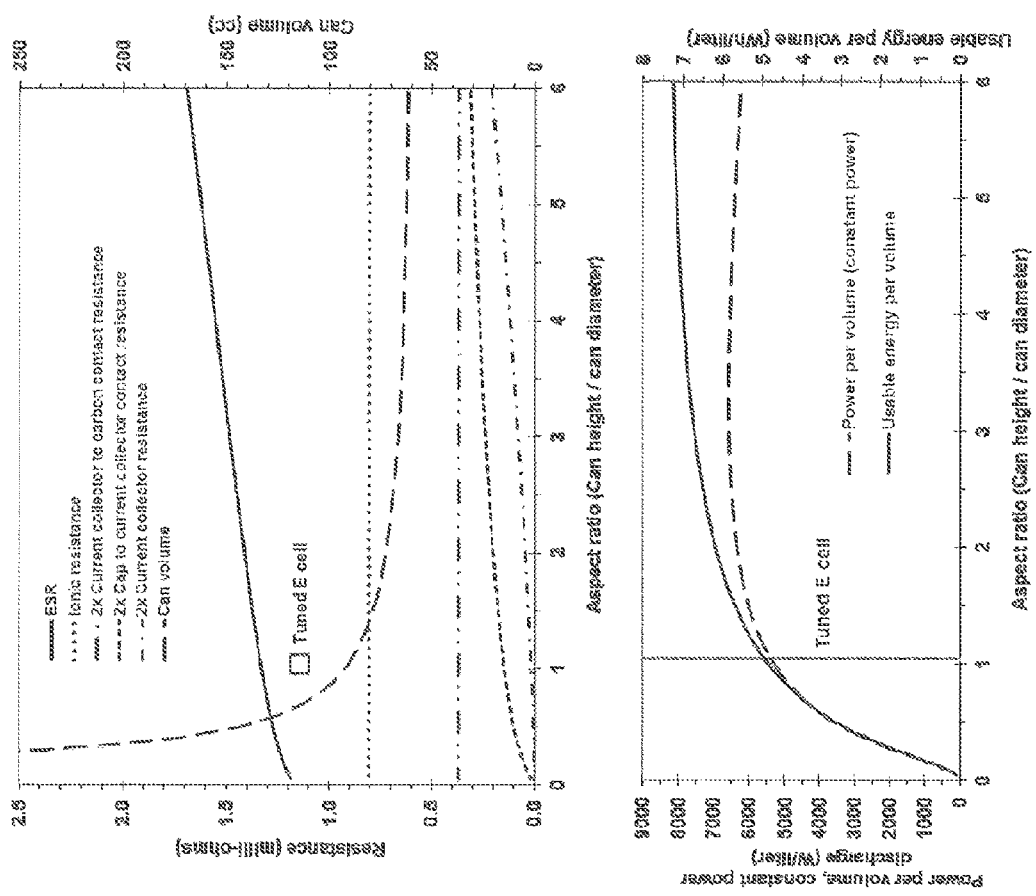
FIG. 13 is a plot of modeled ESR, volumetric energy density and volumetric power density versus aspect ratio for an example tuned electrode cell according to an embodiment.
Figure 14:
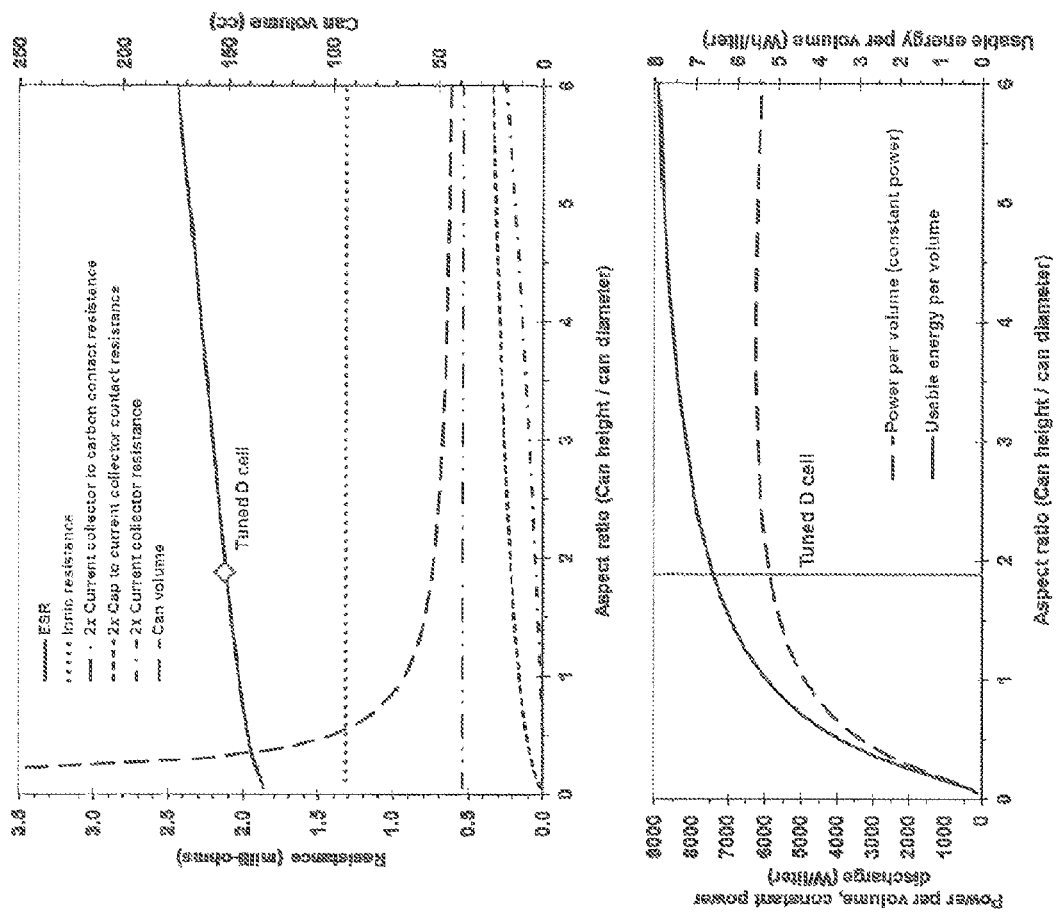
FIG. 14 is a plot of modeled ESR, volumetric energy density and volumetric power density versus aspect ratio for an example tuned electrode cell according to a further embodiment.
Figure 15:
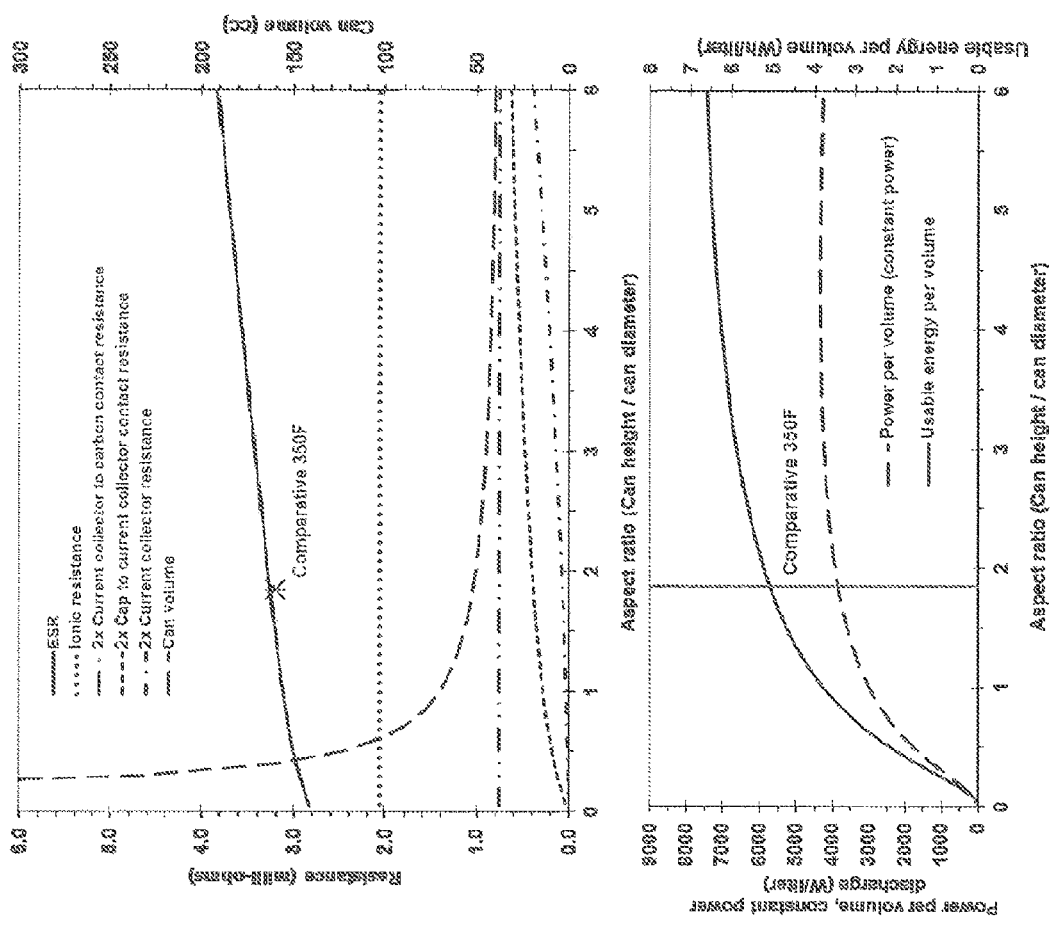
FIG. 15 is a plot of modeled ESR, volumetric energy density and volumetric power density versus aspect ratio for a comparative cell design.
Figure 16:
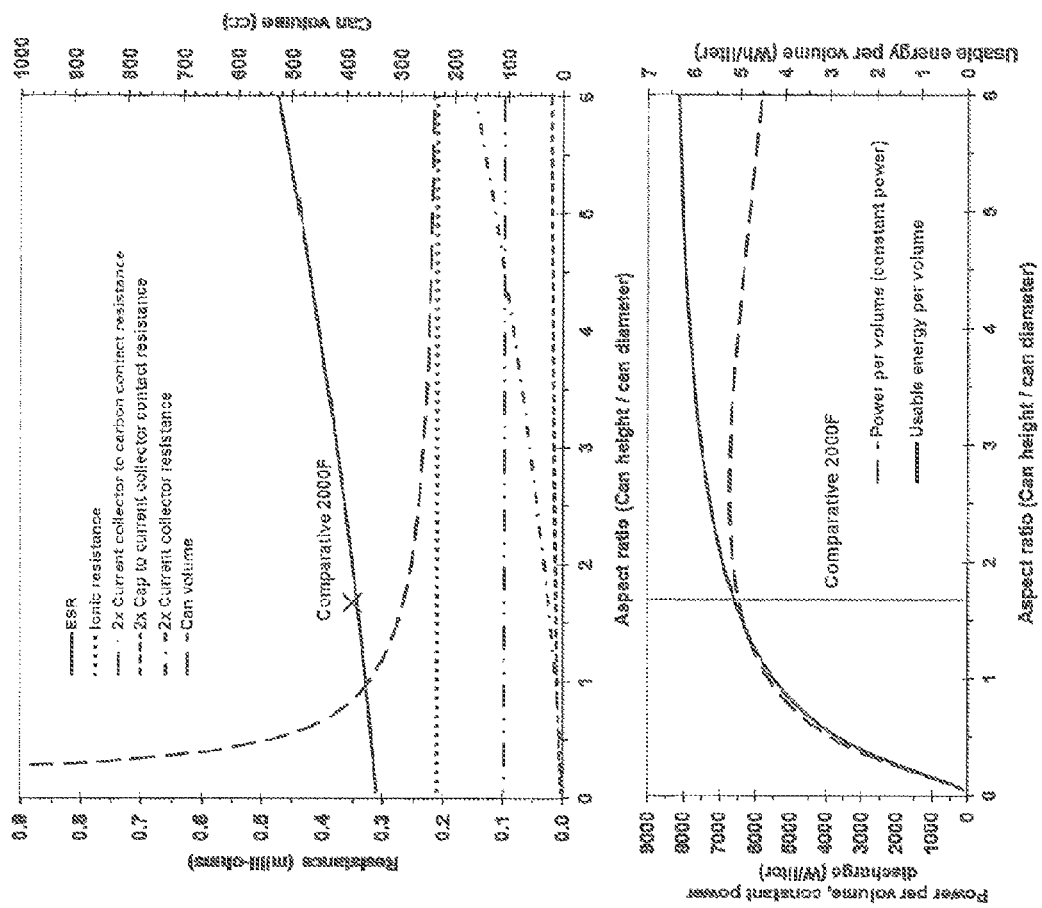
FIG. 16 is a plot of modeled ESR, volumetric energy density and volumetric power density versus aspect ratio for a further comparative cell design.

FIG. 13 shows the modeling results for the ESR of an example tuned electrode E cell. This cell has electrodes with differing specific capacitance. The modeled ESR is 17% higher than the measured value. FIG. 14 shows the modeling results for the ESR of a tuned electrode D cell. It has the same electrode types as the E cell of FIG. 13, but different dimensions. Here the modeled ESR is 0.5% lower than the measured value. FIG. 15 shows the modeling results for a conventional 350 F cell, where the modeled ESR is 2% lower than the measured value. FIG. 16 shows the modeling results for a conventional 2000 F cell, where the modeled ESR is also 2% lower than the measured value.

Figure 17:
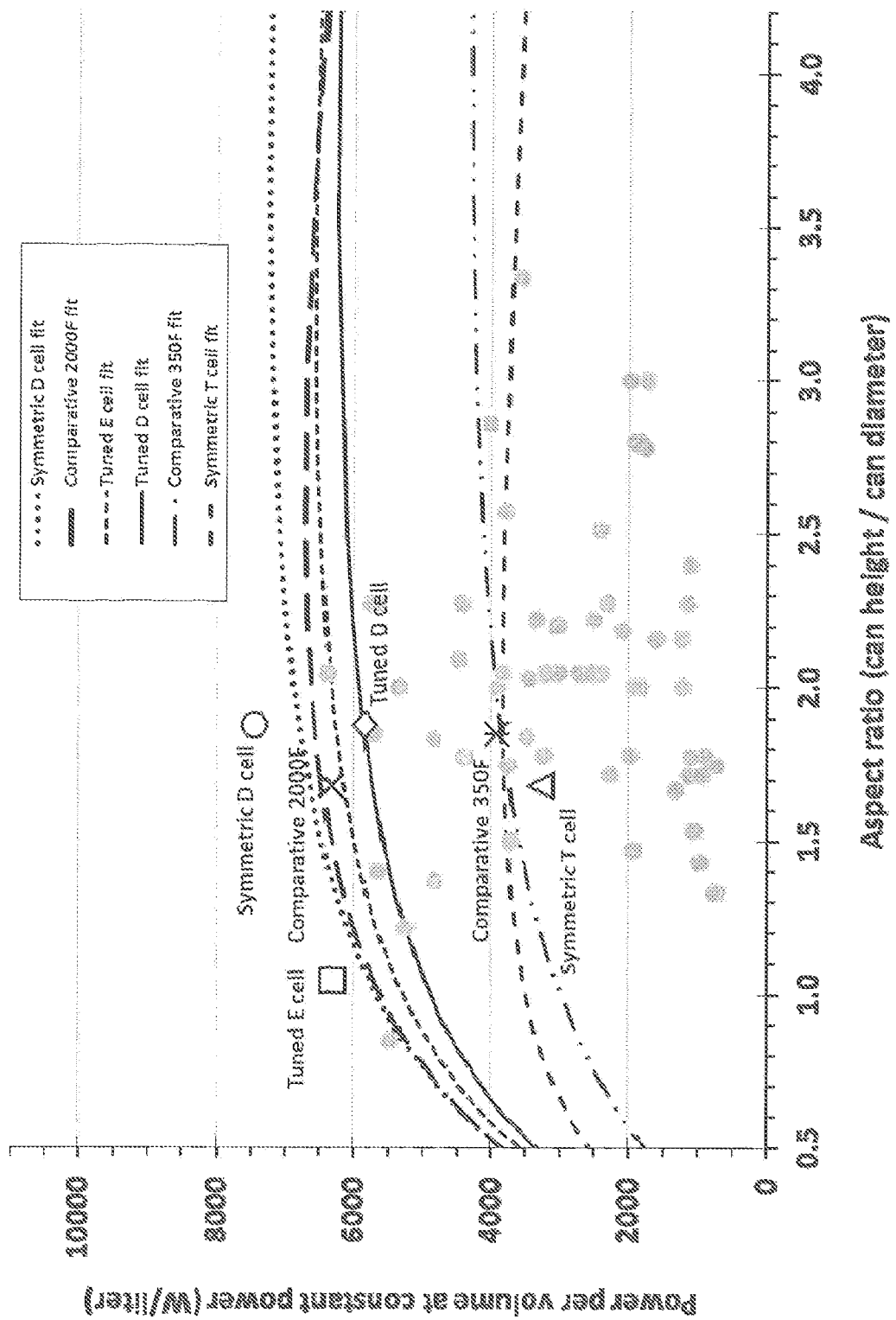
FIG. 17 is a plot of volumetric power density versus aspect ratio

FIG. 17 is a summary of the volumetric power densities of the cells shown in FIG. 1 as a function of aspect ratio. From FIG. 17 it can be concluded that the volumetric energy density increases continuously with increasing aspect ratio while the volumetric power density (for cells with similar specific capacitance electrodes) exhibits a local maximum.

Figure 18:
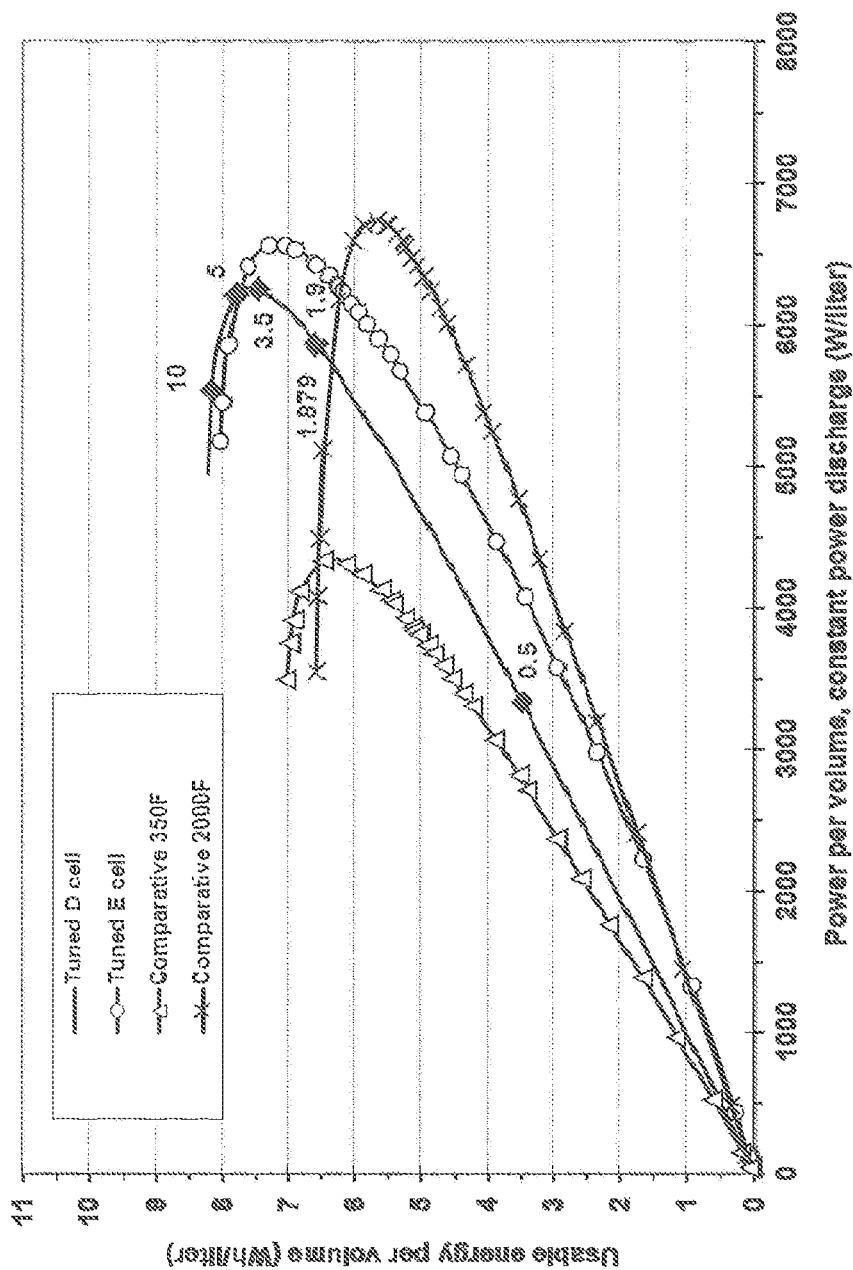
FIG. 18 is a modeled volumetric Ragone plot for EDLCs with varying aspect ratios.

FIG. 18 shows a Ragone plot of modeling results at constant discharge power for selected EDLCs. For an example EDLC (shown with the simple solid line), the energy density and power density each increase with increasing aspect ratio until an aspect ratio of about 3.6. For aspect ratios greater than about 3.6, the power density decreases while the energy density continues to increase, but at a lesser rate.

This same phenomena is observed for the other samples, where the tuned electrode E-cell and the commercial 350 F cell exhibit a maximum power density at a cell aspect ratio of about 5, while the commercial 2000F cell exhibits a maximum power density at a lower cell aspect ratio.

According to embodiments, high volumetric energy, cylindrical EDLC designs have a minimum aspect ratio of about 3.1. Example cells comprise a pair of carbon-based electrodes where both carbon electrodes have a specific capacitance of at least 65 F/cm³, and the carbon electrode/electrolyte combination allows a maximum operational voltage≥2.7V.

As illustrated in FIG. 9, advantaged cylindrical EDLC designs can have a maximum useful aspect ratio of about 15. For greater aspect ratios, the can packaging efficiency and attendant cell volumetric energy density start to decrease. As illustrated in FIG. 18, cylindrical EDLC designs exhibiting a maximum volumetric power density have aspect ratios within the range of about 3.1 to 5.

As shown in calculations associated with FIG. 5, cylindrical EDLCs with electrodes of the same thickness but having different specific capacitances have a preferred orientation that slightly increases the EDLC's volumetric energy density.

As shown below, EDLCs having a higher aspect ratio can be incorporated into a package having a thinner wall thickness than EDLCs having a low aspect ratio.

The package hoop stress $\sigma_h$ (in MPa) can be expressed as:

$$\sigma_h = \frac{p d_{can}}{2 t_{can}}$$

where p is the internal pressure of the can, $d_{can}$ is the internal diameter of the can and $t_{can}$ is the cylindrical wall thickness of the can.

Thus, if the can diameter is reduced by a factor of two, the cylindrical wall thickness can also be reduced by a factor of two, while maintaining the same hoop stress in the can. Similar results are obtained for the axial (or longitudinal) stress. The hoop stress is a measure of the can's ability to resist internal pressure. Such a decrease in wall thickness can reduce cell weight and cost. The saved space may also facilitate an additional wrap or half wrap within the can.

Figure 19:
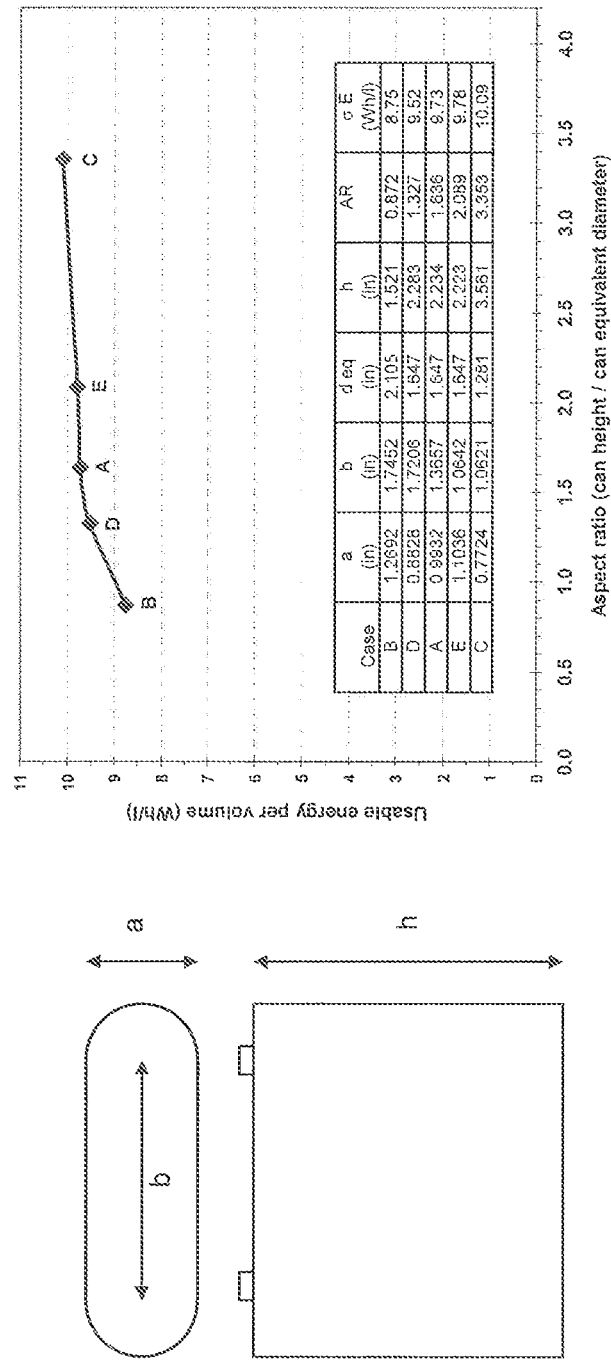
FIG. 19 is a plot of volumetric usable energy versus aspect ratio for oblong cells.

The benefits of an optimized aspect ratio on volumetric energy are believed to be extendable to other cell geometries that involve jelly roll designs (as can be found in oblong cells) or layered electrode designs (as can be found in prismatic cells). FIG. 19 provides the dimensions for five case studies, A through E.

To compare these designs with respect to aspect ratio, consider an equivalent diameter $d_{eq}$ as a function of parameters a and b shown in FIG. 19.

$$d_{eq} = \sqrt{\frac{ab + \frac{1}{4}\pi a^2}{\frac{\pi}{4}}}$$

The aspect ratio for an oblong cell could be considered as $$AR = \frac{h}{d_{eq}}$$

where h is the can height.

FIG. 19 shows that the modeled volumetric energy density increases 15% as the AR increases from 0.87 to 3.53. The general trend is that for a given ratio of b/a, the energy densities (measure in Wh/L and Wh/Kg) each increase as the plan view area decreases.

Figure 20:
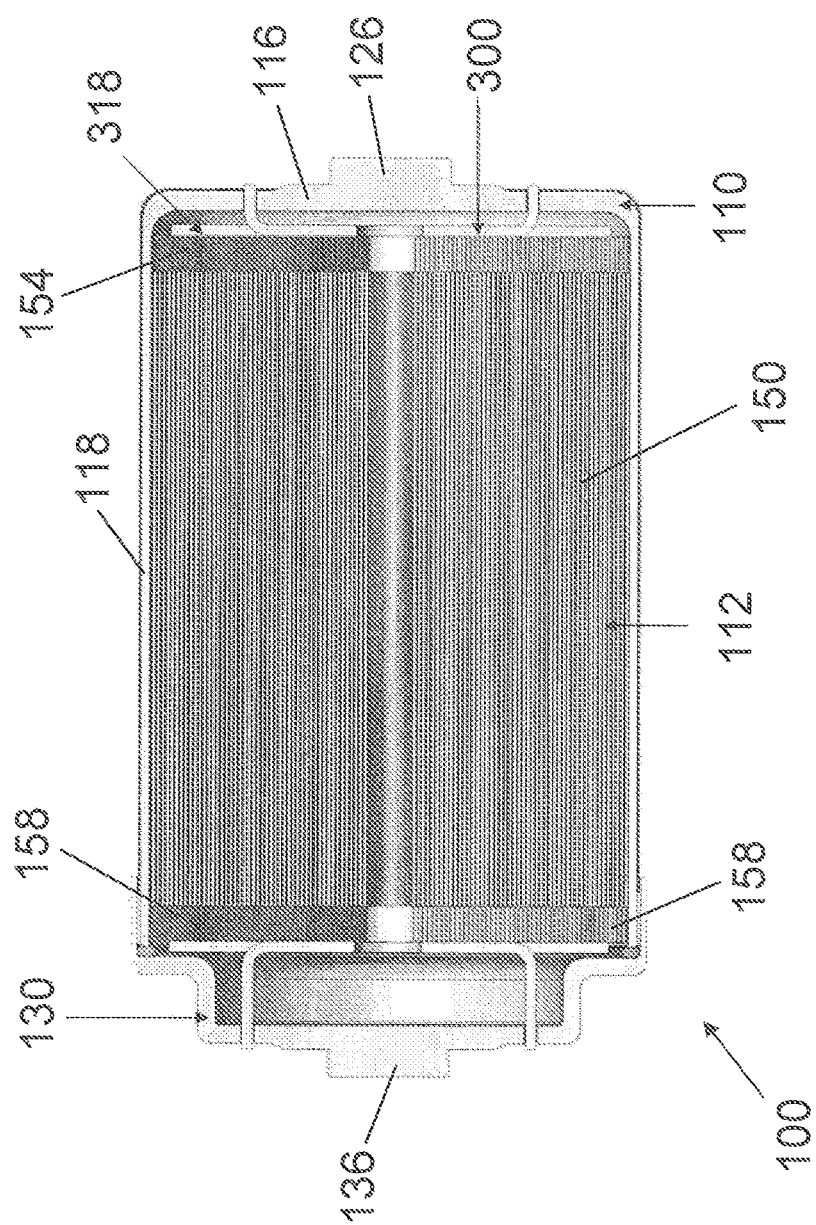
FIG. 20 is cross-sectional view of an example ultracapacitor package.

An example ultracapacitor package 100 is illustrated schematically in cross-section in FIG. 20. The ultracapacitor package 100 includes a housing 110 defining an interior volume 112. The housing 110 comprises an end wall 116, side walls 118, and an end cap 130 configured to sealably engage with the side walls 118 to enclose the interior volume 112. Conventional methods can be used to form the housing including, for example, impact extrusion.

An electrode set such as a jelly roll electrode set can be incorporated into the interior volume 112. In embodiments, the electrode set 150 can adopt a conventional construction comprising, for example, electrodes divided by at least one separator layer. Each of the electrodes can include a carbon-based layer formed over at least one major surface of a current collector. The current collector can be formed, for example, from a conductive foil such as aluminum. As used herein, a layer that is "formed over" another layer will be in electrical contact but not necessarily in direct physical contact with the other layer.

Figure 21:
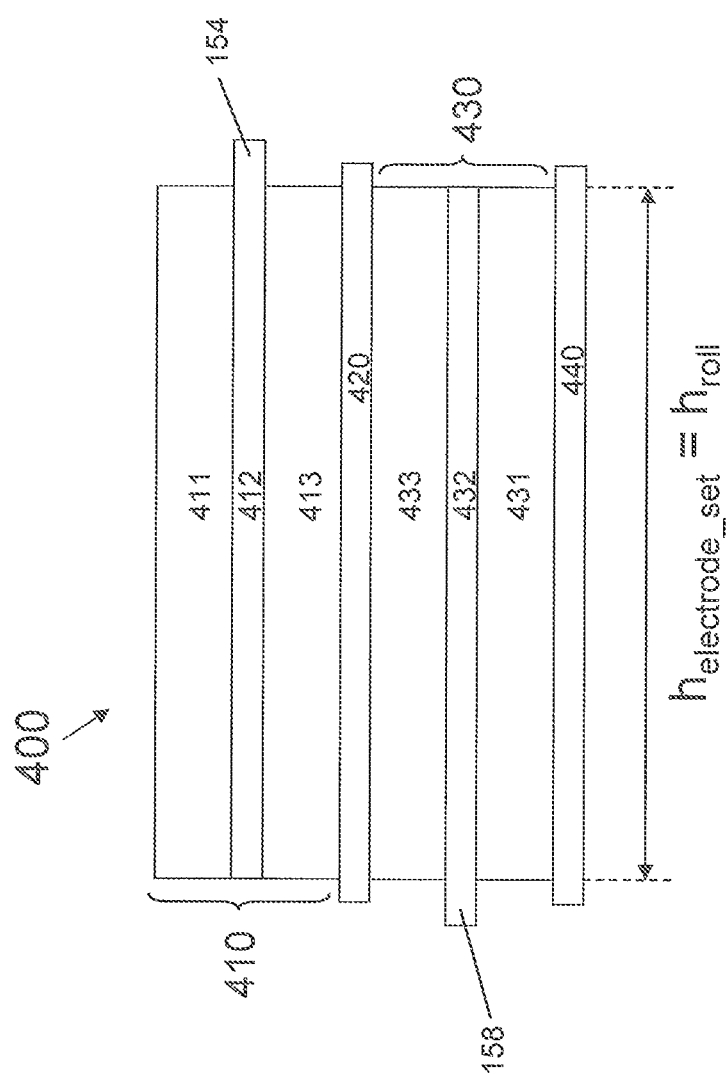
FIG. 21 is a cross section of an electrode set for forming a jelly roll capacitor.

In an example design, a pair of electrodes and two separator layers are stacked in an alternating manner and rolled along an axis into a jelly roll cylinder. Referring to FIG. 21, depicted is an electrode set 400 that includes a first carbon-based electrode 410, a second carbon-based electrode 430, a first porous separator 420 that separates the first carbon-based electrode 410 from the second carbon-based electrode 430, and a second porous separator 440 adjacent to the second carbon-based electrode 430 on the side opposite to the side facing the first porous separator 420. The first carbon-based electrode 410 includes a current collector 412 that is disposed between activated carbon layers 411 and 413. The second carbon-based electrode 430 includes a current collector 432 that is disposed between activated carbon layers 431 and 433.

Figure 22:
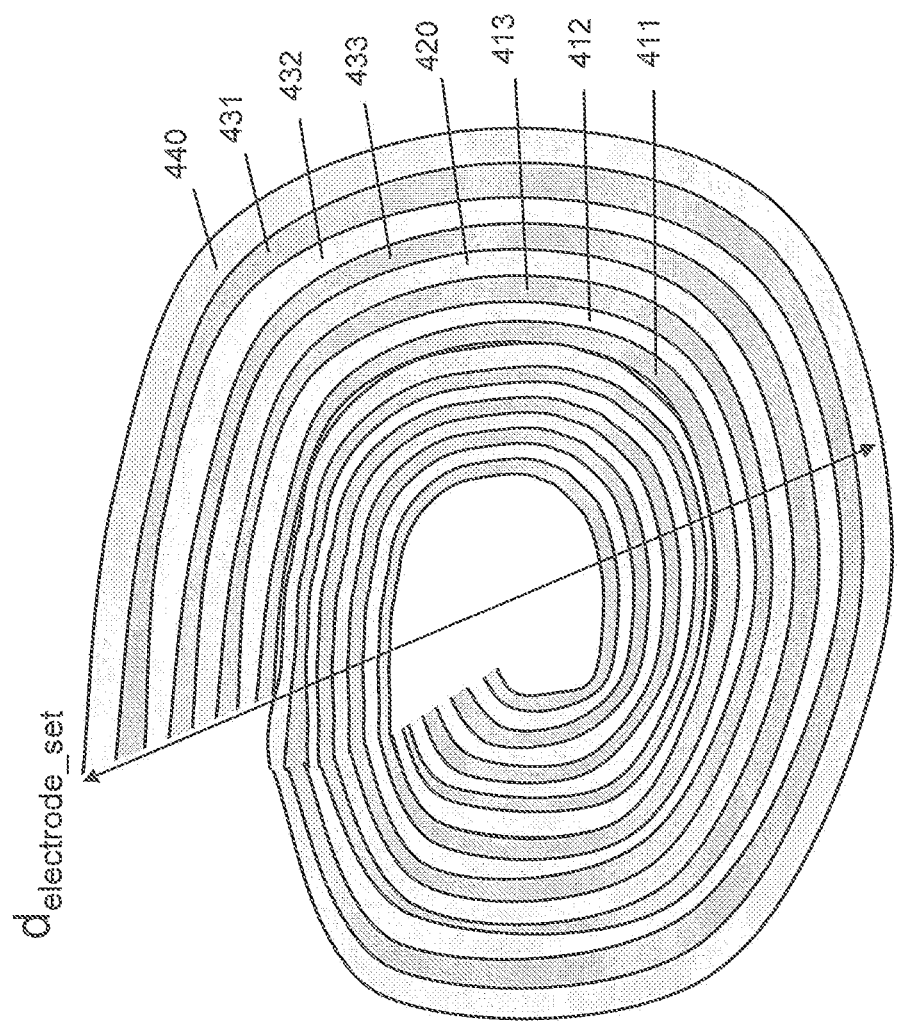
FIG. 22 is a cross section of a partially-coiled electrode set.

The height of the electrode set, $h_{electrode\_set}$, is the height of the carbon-based electrode 410 (which is the same as the height of the other carbon electrodes), which is equivalent to $h_{roll}$. This is illustrated in FIG. 21. The diameter of the electrode set $d_{electrode\_set}$ is the diameter of a circle whose area is equal to the outer footprint area of the electrode set in the plane perpendicular to the height of the electrode set. This diameter is illustrated for a partially-coiled jelly roll configuration in FIG. 22. The aspect ratio of the electrode set is the ratio of $h_{electrode\_set}/d_{electrode\_set}$.

Once formed, the electrode set can have, for example, a circular or an oval cross section. Prior to rolling, the electrodes can be configured such that portions of each respective current collector extend beyond the other components in opposite directions to form first and second capacitor terminals 154, 158. Thus, when the electrodes and the separators are rolled, the capacitor terminals 154, 158 at opposing ends of the cylinder provide a means to connect the resulting jelly roll capacitor to the package terminals 126, 136. In some designs, the extended portions of each current collector can be pressed or matted together to facilitate robust electrical connections.

As noted above, the jelly roll can be formed by coiling the stack of materials around a mandrel. The mandrel, if used, can be removed after the jelly roll is formed, or left in place to function, for example, as a heat sink in the capacitor during operation.

Referring again to FIG. 20, a terminal plate 300 can provide electrical contact between the capacitor terminals 154, 158 and the respective package terminals 126, 136. Together with the electrode set 150, a terminal plate 300 can be incorporated into the interior volume 112 of package 100 such that one surface 318 of the terminal plate makes physical and electrical contact with a capacitor terminal 154 or 158 and thus provides an electrical connection to package terminal 126. A single terminal plate can be incorporated at either end of the housing, or a package can comprise a pair of terminal plates.

In embodiments, the current collector can comprise any conductive material suitable for use in an electrochemical double layer capacitor. In one aspect, at least one of the current collectors comprises a flexible conductive material (e.g., conductive foil) that can be, for example, folded, rolled, or coiled. The current collectors can be made from a metal.

The carbon-based layer can increase the surface area of the electrode, and can include porous carbon or activated carbon. In various embodiments, one or both of the electrodes comprise activated carbon.

The separator layer can be a porous layer that allows a liquid electrolyte to permeate and/or diffuse there through.

For example, the separator layer(s) can comprise paper, mica, glass, ceramic, aerogel, silica, non-conductive carbon, polymeric material, or a combination thereof.

The dimensions of the individual layers (height, length, thickness) as well as number of rolls can define the dimensions of the resulting electrode set. In embodiments, the electrode set can have a height (defined parallel to the rolling axis) and a diameter (defined perpendicular to the rolling axis) such that a ratio of height to diameter ranges from about 3.1 to 15, e.g., from about 3.1 to 5. A lower limit on the aspect ratio of the electrode set can be, for example 3.1, 3.5, 4, 4.5, 5, 5.5, 6, 6.5 or 7, and an upper limit on the aspect ratio of the electrode set can be, for example, 4, 4.5, 5, 5.5, 6, 6.5, 7, 7.5, 8, 8.5, 9, 9.5, 10, 10.5, 11, 11.5, 12, 12.5, 13, 13.5, 14, 14.5 or 15.

Further details describing the electrode set, including the current collectors, carbon layers, separator layers and liquid electrolytes are disclosed in commonly-owned U.S. Patent Application Publication Nos. 2010/0306979 and 2009/0320253, the entire contents of which are hereby incorporated by reference.

The interior volume of the package is defined in part by an interior height $h_{can}$ and an interior diameter $d_{can}$. In embodiments, the ultracapacitor package has an aspect ratio $h_{can}/d_{can}$ in a range of 3.1 to 15. A lower limit on the aspect ratio of the package can be, for example 3.1, 3.5, 4, 4.5, 5, 5.5, 6, 6.5 or 7, and an upper limit on the aspect ratio of the package can be, for example, 4, 4.5, 5, 5.5, 6, 6.5, 7, 7.5, 8, 8.5, 9, 9.5, 10, 10.5, 11, 11.5, 12, 12.5, 13, 13.5, 14, 14.5 or 15. In a further embodiment, the ultracapacitor package has an aspect ratio in a range of 3.1 to 5.

A thickness of the individual carbon-based electrodes ($t_{elec-1}$ and $t_{elec-2}$) can independently range from about 50 microns to 300 microns (e.g., 50, 100, 150, 200, 250 or 300 microns). A thickness of the separator ($t_{sep}$) can range from about 10 microns to 300 microns (e.g., 10, 20, 50, 100, 150, 200, 250 or 300 microns).

The architecture of the electrode set, as well as the attendant package, can include one of a variety of different configurations, including cylindrical and oblong shapes. Additional aspects of contemplated double-layer capacitor designs are disclosed in commonly-owned U.S. Pat. No. 7,983,021, the entire contents of which are incorporated herein by reference.

High performance carbon materials, which form the basis of the electrodes, can be made via physical or chemical activation of natural or synthetic carbon precursors. In a physical activation process, raw material or carbonized material is exposed to typically oxidizing conditions (carbon monoxide, oxygen or steam) at elevated temperatures (e.g., greater than 250° C.). Chemical activation on the other hand involves impregnating raw or carbonized material with an activating agent, heating the impregnated carbon to a temperature typically in the range of 400-900° C., and then removing the activating agent. Chemical activating agents include alkali hydroxides or chlorides (e.g., NaOH, KOH, NaCl, KCl), phosphoric acid, or other suitable salts such as $CaCl_2$ or $ZnCl_2$.

Example processes for forming activated carbon using physical (e.g., steam) activation are disclosed in commonly-owned U.S. patent application Ser. No. 13/185,842, and example processes for forming activated carbon using chemical (e.g., KOH-based) activation are disclosed in commonly-owned U.S. Patent Application Publication Nos. 2010/0150814 and 2010/0151328, the entire contents of which are incorporated herein by reference.

Example carbon precursor materials include synthetic phenolic resins and naturally-occurring precursors such as biomass, coconut shells, wheat flour, etc. Example carbon precursor materials and associated methods of forming activated carbon are disclosed in commonly-owned U.S. patent application Ser. Nos. 12/335,044, 12/335,078, 12/788,478 and 12/970,073, the entire contents of which are hereby incorporated by reference.

One method for producing a carbon-based electrode comprises heating a suitable carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, removing the inorganic compound from the first carbon material to produce an activated carbon material, optionally heating the activated carbon in an inert or reducing atmosphere to decrease the oxygen content in the activated carbon, and forming a carbon-based electrode from the activated carbon.

In one embodiment, an electric double layer capacitor comprises a first electrode (e.g., positive electrode) comprising a first carbon material and a second electrode (e.g., negative electrode) comprising a second carbon material. The respective carbon materials can be made by identical, similar or distinct processes. For example, the activated carbon that is incorporated into the positive electrode can be made using a chemical activation process while the activated carbon that is incorporated into the negative electrode can be made using a physical activation process, or vice versa.

This disclosure provides electric double layer capacitors having a defined aspect ratio, which can result in an optimized energy density and power density for the cell. In addition to the defined aspect ratios, the electric double layer capacitors may comprise activated carbon materials having a novel cross-section of attributes. Whether made by similar or distinct processes, the activated carbon that is incorporated into the respective (positive and negative) electrodes may have the same or different properties, such as average pore size, pore size distribution, or specific capacitance.

In embodiments, the activated carbon can be characterized by a high surface area. A carbon-based electrode for an EDLC can include carbon having a specific surface area greater than about 300 m$^2$/g, i.e., greater than 300, 350, 400, 500 or 1000 m$^2$/g. Further, the activated carbon can have a specific surface area less than 2500 m$^2$/g, i.e., less than 2500, 2000, 1500, 1200 or 1000 m$^2$/g.

The activated carbon can comprise micro-, meso- and/or macroscale porosity. As defined herein, microscale pores have a pore size of 2 nm or less. Mesoscale pores have a pore size ranging from 2 to 50 nm. Macroscale pores have a pore size greater than 50 nm. In an embodiment, the activated carbon comprises a majority of microscale pores. As used herein, the term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity).

According to embodiments, a carbon-based electrode for an EDLC comprises activated carbon having a total porosity greater than about 0.4 cm$^3$/g (e.g., greater than 0.4, 0.45, 0.5, 0.55, 0.6, 0.65 or 0.7 cm$^3$/g). The portion of the total pore volume resulting from micropores (d≤2 nm) can be about 90% or greater (e.g., at least 90, 94, 94, 96, 98 or 99%) and the portion of the total pore volume resulting from ultramicropores (d≤1 nm) can be about 50% or greater (e.g., at least 50, 55, 60, 65, 70, 75, 80, 85, 90 or 95%).

The pore size distribution of the activated carbon can include ultramicropores, micropores, mesopores and macropores and may be characterized as having a unimodal, bimodal or multi-modal pore size distribution. The ultramicropores can comprise 0.2 cm$^3$/g or more (e.g., 0.2, 0.25, 0.3, 0.35 or 0.4 cm$^3$/g or more) of the total pore volume. Pores having a pore size (d) in the range of 1<d≤2 nm can comprise 0.05 cm$^3$/g or more (e.g., at least 0.1, 0.15, 0.2 or 0.25 cm$^3$/g) of the total pore volume. If present, any pores having a pore size greater than 2 nm, which may include mesopores and/or macropores, can comprise 0.15 cm$^3$/g or less (e.g., less than 0.1 or 0.05 cm$^3$/g) of the total pore volume.

The specific capacitance of the carbon can influence its performance when incorporated into high energy density devices such as electric double layer capacitors (EDLCs). Higher specific capacitance generally results in a higher volumetric energy density of the resulting device. In embodiments, the specific capacitance of the carbon incorporated into the positive and negative electrodes is at least 65 F/cm$^3$ (e.g., at least 65, 70, 75, 80, 85, 80, 95 or 100 F/cm$^3$). In further embodiments, the specific capacitance of the carbon incorporated into the positive electrode can be at least 80 F/cm$^3$ (e.g., at least 80, 85, 80, 95 or 100 F/cm$^3$) while the specific capacitance of the carbon incorporated into the negative electrode can be at least 65 F/cm$^3$ (e.g., at least 65, 70, 75, 80, 85, 80, 95 or 100 F/cm$^3$).

In addition to adjusting the aspect ratio of the cell and the characteristics of the activated carbon material incorporated therein, Applicants have found that the initial capacitance of an ultracapacitor comprising tuned carbon-based electrodes can be increased by increasing the thickness of the negative electrode relative to the positive electrode. In embodiments, the negative electrode thickness can be 5, 10, 20, 30, 40, 50, 60, 70, 80, 90 or 100% greater than the positive electrode thickness.

During use of the disclosed devices, the geometric configurations disclosed herein may enable a higher operating voltage than can be used with conventional devices. For example, an operating voltage of an EDLC having a disclosed aspect ratio may be greater than 2.5 V (e.g., at least 2.5, 2.6, 2.7, 2.8, 2.9, 3.0, 3.1 or 3.2 V).

By way of example, a carbon layer having a thickness in the range of about 100-300 micrometers can be prepared by rolling and pressing a powder mixture comprising 60-90 wt. % activated carbon, 5-20 wt. % carbon black and 5-20 wt. % PTFE. Carbon sheets can be stamped or otherwise patterned from the carbon layer and laminated to a conductive current collector to form a carbon-based electrode.

According to an embodiment, an electrode set for an electrochemical cell comprises a first electrode comprising a first activated carbon material, a second electrode comprising a second activated carbon material, a porous separator, and a pair of electrically conductive current collectors, where the porous separator is disposed between the first electrode and the second electrode, and the first and second electrodes are each in electrical contact with a respective current collector.

Electrochemical double layer capacitors may be used for energy storage, for example, in hybrid vehicles such as micro hybrid electric vehicles (employing start-stop, regenerative braking, and engine boost technologies) and mild hybrid electric vehicles (employing start-stop and regenerative braking technologies). Such energy storage systems will typically be located in the engine compartment where space constraints can be high. Because the size of an EDLC is largely determined by the amount of energy it stores, the high volumetric energy density EDLCs disclosed herein advantageously occupy less space and may be desirable for use in hybrid vehicles.

As used herein, the singular forms "a," "an" and "the" include plural referents unless the context clearly dictates otherwise. Thus, for example, reference to a "porous separator" includes examples having two or more such "porous separators" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A coiled electrode set for an electrochemical double layer capacitor comprising:
    a first electrode that includes a first current collector having opposing major surfaces, and an activated carbon layer formed over each of the opposing major surfaces of the first current collector;
    a second electrode that includes a second current collector having opposing major surfaces, and an activated carbon layer formed over each of the opposing major surfaces of the second current collector; and
    a porous separator positioned between the first and second electrodes, wherein the electrode set has an aspect ratio in a range of 5.5 to 8.

2. The coiled electrode set according to claim 1, wherein the first electrode is a negative electrode and the second electrode is a positive electrode and a thickness of the negative electrode is at least 5% greater than a thickness of the positive electrode.

3. The coiled electrode set according to claim 1, wherein the electrode set has a cylindrical geometry.

4. The coiled electrode set according to claim 1, wherein the electrode set has an oblong geometry.

5. The coiled electrode set according to claim 1, wherein the activated carbon formed over each of the opposing major surfaces of the first current collector has a specific capacitance of at least 65 F/cm$^3$ and the activated carbon formed over each of the opposing major surfaces of the second current collector has a specific capacitance of at least 65 F/cm$^3$.

6. The coiled electrode set according to claim 1, wherein a portion of the second electrode is unpaired at an inner radius of the coiled electrode set and a portion of the first electrode is unpaired at an outer radius of the coiled electrode set, and a specific capacitance of the activated carbon incorporated into the first electrode is less than a specific capacitance of the activated carbon incorporated into the second electrode.

7. A cylindrical electrode set for an electrochemical double layer capacitor having a height and a diameter such that an aspect ratio defined as height/diameter is in a range of 5.5 to 8.

8. A package for an electrochemical double layer capacitor comprising:
    an oblong housing defining an interior volume, the housing having an end wall, side walls, and an end cap configured to sealably engage with the side walls to enclose the interior volume, wherein the interior volume has a height ($h_{can}$) and a diameter ($d_{can}$) such that an aspect ratio defined as $h_{can}/d_{can}$ is in a range of 5.5 to 8.

9. The package according to claim 8, wherein the aspect ratio is in a range of 6 to 8.

10. A method of forming a coiled electrode set for an electrochemical double layer capacitor comprising
    forming a first electrode having a first current collector with opposing major surfaces, and an activated carbon layer formed over each of the opposing major surfaces of the first current collector;
    forming a second electrode having a second current collector with opposing major surfaces, and an activated carbon layer formed over each of the opposing major surfaces of the second current collector;
    providing a porous separator between the first and second electrodes, and
    rolling the first electrode, second electrode and separator to from a coiled electrode set, wherein the electrode set has an aspect ratio in a range of 5.5 to 8.

11. The method according to claim 10, wherein the aspect ratio is in a range of 6 to 8.

12. The method according to claim 10, wherein the first electrode is a negative electrode and the second electrode is a positive electrode and a thickness of the negative electrode is at least 5% greater than a thickness of the positive electrode.

13. The method according to claim 10, wherein the first electrode, second electrode and separator are rolled into a cylindrical geometry.

14. The method according to claim 10, wherein the first electrode, second electrode and separator are rolled into an oblong geometry.

15. The method according to claim 10, wherein the activated carbon formed over each of the opposing major surfaces of the first current collector has a specific capacitance of at least 65 F/cm$^3$ and the activated carbon formed over each of the opposing major surfaces of the second current collector has a specific capacitance of at least 65 F/cm$^3$.

16. The method according to claim 10, wherein a portion of the second electrode is coiled at an innermost radius of the coiled electrode set such that a portion of the second electrode is unpaired at an inner radius of the coiled electrode set and a portion of the first electrode is unpaired at an outer radius of the coiled electrode set, and a specific capacitance of the activated carbon incorporated into the first electrode is greater than a specific capacitance of the activated carbon incorporated into the second electrode.

17. The method according to claim 10, wherein the activated carbon incorporated into the positive electrode is formed using chemical activation and the activated carbon incorporated into the negative electrode is formed using physical activation.

18. The method according to claim 10, wherein the activated carbon incorporated into the negative electrode is formed using chemical activation and the activated carbon incorporated into the positive electrode is formed using physical activation.

\* \* \* \* \*